US011650346B2

(12) United States Patent
Chang et al.

(10) Patent No.: US 11,650,346 B2
(45) Date of Patent: May 16, 2023

(54) DOWNHOLE ACOUSTIC MEASUREMENT

(71) Applicant: Halliburton Energy Services, Inc., Houston, TX (US)

(72) Inventors: Chung Chang, Houston, TX (US); Qingtao Sun, Spring, TX (US); Andrew Clair Colbert, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 291 days.

(21) Appl. No.: 16/876,265

(22) Filed: May 18, 2020

(65) Prior Publication Data

US 2021/0048548 A1 Feb. 18, 2021

Related U.S. Application Data

(60) Provisional application No. 62/887,081, filed on Aug. 15, 2019.

(51) Int. Cl.
*G01V 1/50* (2006.01)
*G01V 1/46* (2006.01)
*E21B 47/005* (2012.01)
*E21B 47/095* (2012.01)
*E21B 47/12* (2012.01)

(52) U.S. Cl.
CPC .............. *G01V 1/50* (2013.01); *E21B 47/005* (2020.05); *E21B 47/095* (2020.05); *G01V 1/46* (2013.01); *E21B 47/12* (2013.01); *G01V 2210/1212* (2013.01); *G01V 2210/1299* (2013.01); *G01V 2210/1429* (2013.01); *G01V 2210/62* (2013.01)

(58) Field of Classification Search
CPC ........ G01V 1/46; G01V 1/50; G01V 2210/62; G01V 2210/1212; G01V 2210/1299; G01V 2210/1429; E21B 47/005; E21B 47/095; E21B 47/12; E21B 47/107
See application file for complete search history.

(56) References Cited

U.S. PATENT DOCUMENTS

| 3,102,251 | A | * | 8/1963 | Blizard | G01V 1/50 367/29 |
| 3,311,875 | A | * | 3/1967 | Geyer | G01V 1/44 367/41 |
| 6,661,737 | B2 | | 12/2003 | Wisniewski et al. | |
| 8,547,791 | B2 | | 10/2013 | Vu et al. | |
| 9,103,944 | B2 | | 8/2015 | Vu et al. | |
| 11,029,435 | B2 | * | 6/2021 | Goodman | E21B 47/107 |

(Continued)

OTHER PUBLICATIONS

PCT Application Serial No. PCT/US2020/033534, International Search Report, dated Sep. 1, 2020, 3 pages.

(Continued)

*Primary Examiner* — John Fitzgerald
(74) *Attorney, Agent, or Firm* — Delizio, Peacock, Lewin & Guerra

(57) ABSTRACT

A method comprises positioning a receiver in a borehole and determining an offset acoustic waveform at a target point. The method includes generating a reverse time sequence waveform of the determined offset acoustic waveform and generating, by a transmitter, an acoustic pulse based on the reverse time sequence waveform. The method includes detecting, by the receiver, an acoustic response to the acoustic pulse.

19 Claims, 17 Drawing Sheets

(56) References Cited

U.S. PATENT DOCUMENTS

| | | | | |
|---|---|---|---|---|
| 11,067,711 | B2* | 7/2021 | Goodman | G01N 29/348 |
| 11,079,505 | B2* | 8/2021 | Johnson | G01V 1/005 |
| 11,086,040 | B2* | 8/2021 | Ulrich, II | G01V 1/46 |
| 2003/0123326 | A1* | 7/2003 | Wisniewski | G01V 1/44 367/140 |
| 2005/0190648 | A1* | 9/2005 | Tang | G01V 1/50 367/35 |
| 2008/0314586 | A1 | 12/2008 | Freeman | |
| 2012/0120763 | A1* | 5/2012 | Vu | A61P 35/00 367/27 |
| 2014/0150523 | A1* | 6/2014 | Stokely | E21B 47/135 73/152.58 |
| 2015/0168581 | A1* | 6/2015 | Izuhara | E21B 47/005 702/9 |
| 2016/0010448 | A1* | 1/2016 | Chen | E21B 47/00 702/6 |
| 2016/0265348 | A2* | 9/2016 | Chen | E21B 47/00 |
| 2018/0120463 | A1 | 5/2018 | Cooper | |
| 2018/0142545 | A1 | 5/2018 | Lei et al. | |
| 2018/0238837 | A1 | 8/2018 | Chambers | |
| 2019/0101660 | A1 | 4/2019 | Johnson et al. | |
| 2019/0250295 | A1* | 8/2019 | Goodman | G01V 1/50 |
| 2019/0376380 | A1* | 12/2019 | Zhang | G01V 1/50 |
| 2022/0011464 | A1* | 1/2022 | Alali | G01N 33/383 |

OTHER PUBLICATIONS

PCT Application Serial No. PCT/US2020/033534, International Written Opinion, dated Sep. 1, 2020, 7 pages.

Murphy, et al., "Source excitation strategies for obtaining impulse responses in finite difference time domain room acoustics simulation", Applied Acoustics, vol. 82, 2014, 9 pages.

* cited by examiner

DOWNHOLE ACOUSTIC MEASUREMENT

BACKGROUND

The present disclosure relates generally to downhole acoustic measurement operations and, more particularly, to optimizing acoustic signal responses for downhole acoustic measurement operations.

Well drilling and completion operations may require the use of casings within a wellbore in a subterranean formation to ensure that the wellbore does not collapse once it is drilled and that sensitive areas of the formation are protected and isolated. In most cases, a casing is a metallic tubular structure secured in a wellbore using a cement layer that fills an annular space between the casing and inner borehole wall forming the edge of a formation. The cement layer bonds to both the casing and the formation. The strength of both cement bonds is important to the integrity of the well. Measuring acoustic impedance proximate the casing and bonding interfaces may be used to determine the integrity and strength of the bonding particularly between the casing and cement.

Cement bond logging is a technique in which an acoustic measurement tool, such as an ultrasonic measurement tool, is utilized to collect acoustic measurement data that may be interpreted to determine bonding integrity. Following cementing of a new well and prior to production, the acoustic measurement tool may be deployed such as via wireline into a cased and cemented borehole prior. Such acoustic measurement tools and techniques are relatively effective prior to deployment or otherwise in the absence of additional tubing such as production tubing that diminish acoustic signal transmission. However, withdrawing downhole tubing from a cased borehole to conducting acoustic testing is large scale and expensive procedure. For plug and abandonment of a well, such as an offshore well for example, extraction of the production tubing to perform CBL measurements to verify the condition of aging cement and cement bonds is a time consuming and expensive procedure.

BRIEF DESCRIPTION OF THE DRAWINGS

Embodiments of the disclosure may be better understood by referencing the accompanying drawings.

DESCRIPTION

Figure 1:
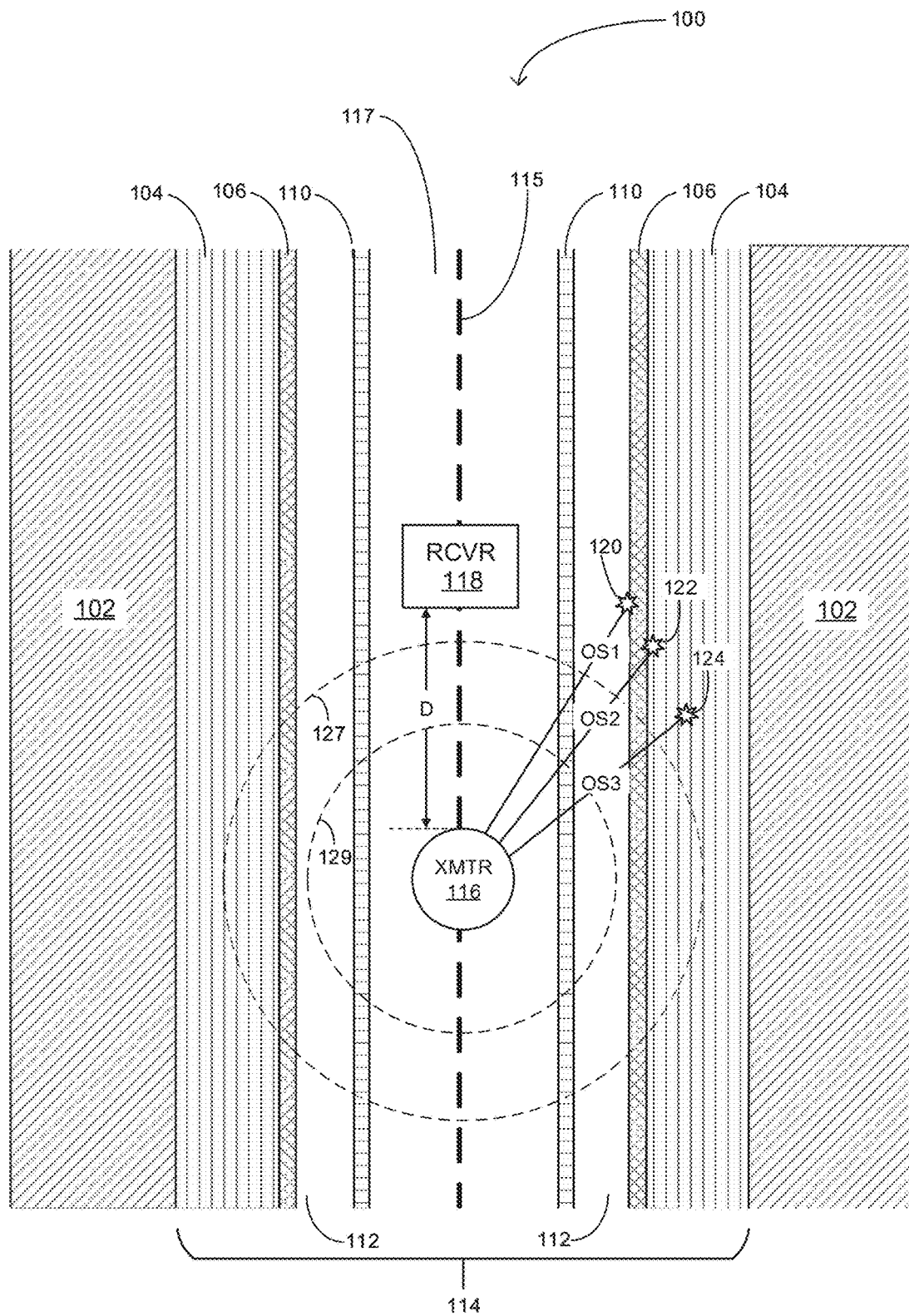
FIG. 1 is a high-level diagram depicting an example Through Tubing Cement Evaluation (TTCE) system in which downhole acoustic sensor components are configured to generate and measure acoustic signals corresponding to one or more target points in accordance with some embodiments.

The description that follows includes example systems, methods, techniques, and program flows that embody aspects of the disclosure. However, it is understood that this disclosure may be practiced without these specific details. For instance, this disclosure refers to cement evaluation in illustrative examples. Aspects of this disclosure can be also be applied to any other type of signal processing operations downhole (e.g., formation evaluation). In other instances, well-known instruction instances, protocols, structures and techniques have not been shown in detail in order not to obfuscate the description.

Disclosed embodiments include methods, systems, and devices configured to address acoustic penetration issues for downhole acoustic measurements. Some acoustic measurements, such as CBL measurements, are utilized to determine material and structural properties and attributes at target points based on reflections and other acoustic echo responses. The signal strength of echo responses, such as may be quantified by signal-to-noise-ratio (SNR), depends in part on the strength/amplitude of the source acoustic signal. The echo response signal strength may also depend on measurement sensitivity in terms of how echo information is obtained from the echo response.

Both source signal amplitude and measurement sensitivity may be significantly affected by layers of materials, such as metals and metallic alloys, that impede acoustic transmission. Metallic borehole casings and production tubing are examples of downhole structures composed of materials (e.g., steel alloys) having acoustic properties that inhibit optimal acoustic transmission to target points. To address decreased acoustic penetration due to casing and tubing, various embodiments may improve the SNR of a target's reflection using signal time compression. Signal time compression may be implemented by first measuring, predicting, simulating, or otherwise determining acoustic signals that occur at specified target points and that originated as acoustic impulse signals transmitted from an acoustic transmitter. A reverse time sequence signal is generated for each of the acoustic signals determined to occur at each of the target points. Overall source signal amplitude may be increased at the selected target points during acoustic measurements by generating short pulse source signals based on the reverse time sequence signals. Such embodiments may further implement beam forming across multiple acoustic source transmitters configured to concurrently increase source signal amplitude at each of one or more target points.

A resultant acoustic waveform at a target point is the cross-correlation of the transmitted impulse/pulse with its propagating function that may have been previously measured by transmitting an impulse signal. The resultant acoustic waveform may comprise a localized spike of pressure pulses generated at the target point/position in response to one or more of the short pulse signals. This signal time compression may be extended simultaneously to several transmitters and the signal strength improvement at a receiving point is proportional to the number of contributing transmitters. Some embodiments can apply multiple signal time compression techniques as part of performing downhole acoustic measurements such as through tubing cement evaluation measurements.

Some embodiments may utilize frequency chirp processing to implement signal time compression. A transmitter chirp comprising a source pulse sequence may include a relatively long time sequence of harmonic waves with controlled phase variations of its output frequency. Subsequently, a received response signal may be cross correlated with the source pulse sequence to obtain an amplitude enhanced transmitter-to-receiver time domain impulse response. The signal to noise ratio is proportional to the amount of energy applied to and emitted from the transmitter, which may be significantly more than when the transmitter is driven with a short duration pulse. The cross correlation of a chirp function to itself equals a delta function in time.

In some embodiments, one or more acoustic sources disposed within production tubing can be used to generate a high amplitude source excitation at or proximate a casing surface outside the production tubing. As described herein, various embodiments provide an improved through tubing cement evaluation measurement especially in borehole surrounds by multiple casings.

In some embodiments, in order to improve the signal to noise ratio of the reflected signals coming from the casing cement interface the radiating acoustic energy can be focused right at or near the inner casing surface with cement positioned behind the casing. Unfortunately, due to the production tubing and multiple casings it can be very challenging for a borehole transmitter to deliver a very strong pressure pulse toward the outside of the tubing because of the high acoustic impedance contrast introduced by the steel tubing and casing.

In comparison to conventional through tubing CBL approaches, various embodiments can generate a larger pressure pulse near the inner casing surface and external to a production tubing. However, embodiments are not limited to a receiving point outside of the production tubing as such receiving points can also be positioned inside the production tubing. Some embodiments use a quadrupole acoustic source.

EXAMPLE OPERATIONS

Embodiments are directed to increasing the measurement sensitivity of through tubing cement evaluation (TTCE) and direct high energy acoustic signals at target points such as at or near a casing, a cement layer, and/or a casing/cement interface. FIG. 1 depicts an example TTCE system 100 in which downhole acoustic sensor components are configured to generate and measure acoustic signals, which may be referred to herein as echo responses, corresponding to one or more target points. For example, the echo responses may comprise reflected and/or refracted acoustic waves generated by acoustic signals transmitted from an acoustic source to respective target points. As shown in FIG. 1, TTCE system 100 is comprises acoustic sensor devices deployed within a well that is defined by a borehole 114 in which production tubing 110 is installed within cement and metallic casing layers.

Borehole 114 is formed within a subsurface formation 102 by drilling, and is typically filled with liquid and/or slurry substances such as drilling fluid (drilling mud), water, etc. The outer perimeter of borehole 114 is sealed from formation 102 by one or more barrier layers. For instance, a casing 106 comprises a metallic tubular member that forms an inner liner that seals the interior of borehole 114. To securely position casing 106 with respect to the inner surface of formation 102, a cement layer 104 is formed between casing 106 and the inner surface of formation 102 that bounds borehole 114. A production tubing 110 is lowered into or otherwise disposed within the cylindrical interior space of casing 106 to form an innermost production conduit 117 and an annular space 112 between production tubing 110 and the casing 106.

An acoustic sensor comprising an acoustic transmitter 116 and an acoustic receiver 118 is positioned within the production tubing 110. Specifically, the acoustic sensor components are movably disposed within and along the length of production conduit 117 via a conveyance means 115 such as may be a wireline. The acoustic sensor may be configured with acoustic transmitter 116 and acoustic receiver 118 as individually contained and independently movable components. Alternatively, the acoustic sensor may be configured within a contiguous sensor housing in which both transmitter 116 and receiver 118 are contained. The acoustic sensor is configured to measure acoustic responses, such as in the form of acoustic echoes, generated from acoustic source signals transmitted from acoustic transmitter 116 to various target points within borehole 114. Three such target points 120, 122, and 124 are illustrated in FIG. 1, all three of which are located outside of production tubing 110, and two of which are located outside of casing 106.

Target point 120 is located at or just beneath the surface of casing 106 for acoustic testing that encompasses determining casing material integrity. Target point 122 is located on or immediately adjacent to the interface between casing 106 and cement layer 104. Measurements obtained for echo responses from points, such as target point 122, along the casing/cement interface may be utilized for assessing the cement-to-casing bonding that is significant for determining the condition of the downhole borehole formation sealing apparatus. Similarly, target points, such as target point 124 may be located within the cement layer 104 to determine material properties and changes to material properties therein. In the depicted configuration, acoustic transmitter 116 and acoustic receiver 118 are located within production tubing 110 and all three of target points 120, 122, and 124 are located outside of production tubing 110.

As shown in FIG. 1, acoustic source signals 127 and 129 propagate radially outward from acoustic transmitter 116 in the depicted substantially spherical pattern with transmitter 116 configured as a monopole transmitter. The relatively high acoustic attenuation of metallic layers such as presented by the wall of production tubing 110 may result in significant attenuation of acoustic source signals 127 and 129 prior to reaching casing 106. Therefore, acoustic signals 127 and 129 may be substantially attenuated prior to reaching one or more of target points 120, 122, and 124. A compound attenuation effect is presented by casing 106, which like production tubing 110, may be constructed of acoustically conducive material such as metals and metallic alloys. Having a relatively high internal acoustic transmissivity, casing 106 and production tubing 110 act as a double layer acoustic energy sink. As a result, acoustic signals 127 and 129 may be dramatically reduced in amplitude when they reach target points 122 and 124 having passed through production tubing 110 and casing 106.

The acoustic responses corresponding to the attenuated signals may have insufficient amplitude to produce reliable acoustic measurement results as rendered in acoustic responses received and detected by acoustic receiver 118. An acoustic sensor and supporting electronics such as depicted in FIG. 1, and as depicted and described in further detail with reference to FIGS. 2-13, may be configured to increase response signal quality such as in terms of SNR of the detected echo response signal. The response signal quality and hence measurement sensitivity may be increased by waveform shaping of source acoustic signals transmitted such as by acoustic transmitter 116. In some embodiments, an impulse response waveform, or as described herein, an offset acoustic waveform, corresponding to a short pulse source signal such as an impulse signal may be determined for one or more selected target points having specified offsets from the acoustic transmitter source. For example, the signal processing components such as within or communicatively coupled with transmitter 116 may determine offset acoustic waveforms for each of target points 120, 122, and 124 that result from or otherwise correspond to short pulse source signals such as impulse source signals transmitted by transmitter 116. Signal properties such as amplitude and phase for each determined offset acoustic waveform at each target point may be determined in part based on the respective offset distance and/or direction between transmitter 116 and each target point.

For example, target points 120, 122, and 124, have depicted offsets OS1, OS2, and OS3, respectively. The offset acoustic waveforms may be determined via physically simulation such as in a controlled laboratory in which the borehole environment is physically modeled by controlled tubing, casing, and cement layers. Alternatively, the offset acoustic waveforms may be simulated by computer modeling such as via a finite-difference time domain (FDTD) simulation. The components of transmitter 116 are further configured to generate reverse time sequence versions of the determined offset acoustic waveforms. The final step of wave-forming the acoustic source signal is implemented by transmitter 116, which is configured to emit/transmit a short duration acoustic pulse that is generated from the reverse time sequence waveform. The cumulative acoustic signal, representing the overall pressure response at a given target point is substantially higher in amplitude and energy than the determine response signals. The cumulative acoustic response is equal to the cross-correlation of the reverse time sequence waveform for the target point with the determined offset acoustic waveform for the same target point.

In some embodiments, acoustic transmitter 116 and supporting electronics and other components may be configured to improve measurement sensitivity by increasing the amplitude of a transmitted acoustic signal as it reaches target points such as target points 120, 122, and 124. In some embodiments, the response signal quality may be enhanced in terms of extending the dynamic range of the receiver by using frequency chirps as source acoustic signals. Increasing the dynamic range enables the receiver, such as receiver 118, to extract noise such as transmitter interference such as for configurations in which the distance, D, between transmitter 116 and receiver 118 is below a threshold distance.

Figure 2:
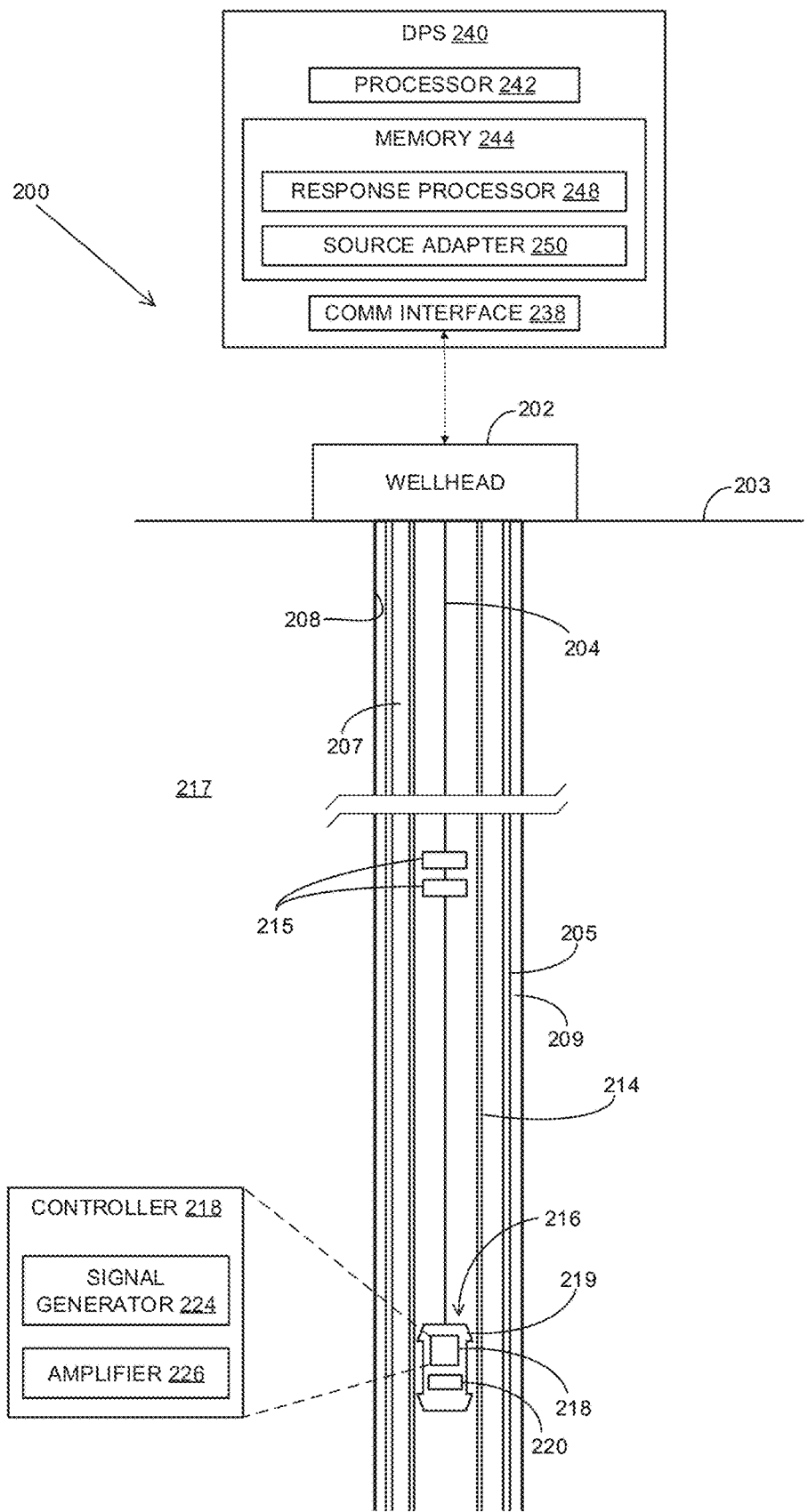
FIG. 2 is a conceptual and partial block diagram illustrating a well system that is configured to implement TTCE and other downhole acoustic measurement operations in accordance with some embodiments.

FIG. 2 is a block diagram depicting a well system 200 configured to implement downhole acoustic measurement testing in accordance with some embodiments. Well system 200 includes subsystems, devices, and components configured to implement acoustic measurement testing procedures within a cylindrical wellbore volume 207 that in the depicted embodiment is bounded and sealed by a casing 205. A cement layer 209 between casing 205 and an inner borehole wall 208 provides a protective seal maintains structural and positional stability of casing 205. Well system 200 comprises a wellhead 202 configured to deploy drilling and production and/or injection equipment such as drilling strings, production strings, etc. As shown, an interior tubing 214 is deployed within wellbore volume 207 and may comprise drilling tubing such as drill pipes, production tubing, injection tubing, or other type of movable tubing.

Wellhead 202 includes components for configuring and controlling deployment in terms of insertion and withdrawal of a test string within wellbore volume 207. The test string may be configured as a wireline test string deployed within interior tubing 214 and having a wireline cable 204 for moving and providing communication and power source connectivity for downhole test tools. In addition or alternatively, the test string may include multiple connected drill pipes, coiled tubing, or other downhole conduit/piping that is extended and retracted using compatible drill string conveyance components within wellhead 202. In the depicted embodiment, wireline cable 204 is configured as the conveyance means for a test tool that includes an acoustic source 216 and a set of acoustic receivers 215. Communication and power source couplings are provided to acoustic source 216 and acoustic receivers 215 via wireline cable 204 having one or more communication and power terminals within wellhead 202.

Acoustic source 216 and acoustic receivers 215 comprise components, including components not expressly depicted in FIG. 1, configured to implement acoustic measurement testing including CBL testing. Acoustic receivers 215 may comprise hydrophones configured as an array to detect acoustic echoes resulting from the acoustic signals transmitted by acoustic source 216. Acoustic source 216 comprises a tool body 219 containing a transmitter in the form of an acoustic transducer 220. Acoustic source 216 further includes a controller 218 comprising components configured to process and generate electrical signals that are converted by acoustic transducer 220 into acoustic waves emitted from acoustic source 216 within wellbore 207. As shown, controller 218 includes a signal generator 224 and an amplifier 226.

Signal generator 224 is configured using any combination of hardware and/or program code constructs to generate and send excitation pulse signals to amplifier 226. Amplifier 226 is configured to amplify the excitation pulse signals and send the amplified signals to acoustic transducer 220. In some embodiments, transducer 220 comprises a piezoelectric transducer having electrodes that excite a piezoelectric material. In such embodiments, the electrical pulse signals are applied to the transducer electrodes, inducing fluctuating electrical fields and corresponding fluctuating electrical charges applied across the piezoelectric material and resulting in acoustic waves that correspond in frequency, phase, and amplitude to the electrical pulse signals.

Acoustic source 216 and acoustic receivers 215 are coupled via a telemetry link within wireline cable 204 to a data processing system (DPS) 240. DPS 240 includes a communication interface 238 configured to transmit and receive signals to and from acoustic receivers 215 and acoustic source 216 as well as other devices within well system 200 using a communication channel with wireline cable 204 as well as other telemetry links such as wireless electromagnetic links, acoustic links, etc.

DPS 240 may be implemented in any of one or more of a variety of standalone or networked computer processing environments. As shown, DPS 240 may operate above a terrain surface 203 within or proximate to wellhead 202, for example DPS 240 includes processing, memory, and storage components configured to receive and process acoustic measurement information to determine material and structural properties and conditions within and/or external to the cylindrical volume defined by borehole wall 208. DPS 240 is configured to receive acoustic data from acoustic receivers 215 and acoustic source 216 as well as from other sources such as surface test facilities. The acoustic data received from acoustic receivers 215 may include echo response signals detected by acoustic receivers 215. DPS 240 comprises, in part, a computer processor 242 and a memory device 244 configured to execute program instructions for generating source mode select signals based on the acoustic data.

DPS 240 is configured to control operation of acoustic source 216 based on the acoustic data received or otherwise acquired by and stored within DPS 240. DPS 240 includes program components including a response processor 248 and a source adapter 250. Response processor 248 includes program components and data configured to processing acoustic response data such as CBL data received from acoustic receivers 215. Source adapter 250 includes program components and data configured to coordinate source excitation signals with offset acoustic waveforms and/or other acoustic data determined for absolute locations and/or relative positions, referred to herein as target points, within the borehole that may or may not be accessible by receivers such as acoustic receivers 215. Loaded and executing within memory 244, response processor 248 is configured to receive and process acoustic response data that may be provided from acoustic receivers 215. Some target points, such as located within the cement layer 209 or proximate to the interface at which cement layer 209 contacts casing 205, are not accessible by acoustic receivers. For such target points, response processor 248 may determine waveform responses from pressure waveform simulation data based on target point location relative to acoustic source 216.

Source adapter 250 is configured using any combination of program instructions and data to select the acoustic source operating mode. For example, source adapter 250 may be configured to select between a short pulse/impulse mode and a spread spectrum mode of operation for acoustic source 216. The selection between short pulse mode and spread spectrum mode may be based, at least in part, on the distance between acoustic source 216 and one or more of acoustic receivers 215. In some embodiments, source adapter 250 is configured to select spread spectrum mode of operation in response to determining that the distance between acoustic source 216 and one or more of acoustic receivers 215 is less than a threshold distance. The selection between short pulse mode and spread spectrum mode may be significant for various test configurations including configurations in which acoustic source 216 and acoustic receivers 215 may be independently positioned. Source adapter 250 may further include short pulse mode and spread spectrum mode components (not expressly depicted) that are called or otherwise executed in response to selecting the corresponding mode of operation.

When operating in short pulse mode, acoustic source 216 generates and transmits source acoustic pulses that are formed based, at least in part, on selected or otherwise determined target point locations. During CBL testing, for instance, target points may be selected to be points along and/or adjacent to the interface boundary at which cement layer 209 contact casing 205. The waveform shape and amplitude of source pulses are based on the distances between (offset) acoustic source 216 and the target points.

The components of well system 200 are configured to implement acoustic testing from which material properties and structural attributes of components within the borehole are determined. Such properties and structural attributes may include but are not limited to cement structural integrity and the state of adhesion of the bonding between cement layer 209 and casing 205. Well system 200 is particularly configured to address issues posed during acoustic testing in which an acoustic source and one or more acoustic receivers perform so-called through tubing cement evaluation (TTCE). TTCE entails measuring acoustic responses, such as acoustic echoes, generated by acoustic source signals that originate within an inner tubing such as interior tubing 214. The acoustic echoes result from the interaction of the acoustic source signals with material and material boundaries external to the inner tubing such as within at or proximate to the boundary between cement layer 209 and casing 205.

Figure 3:
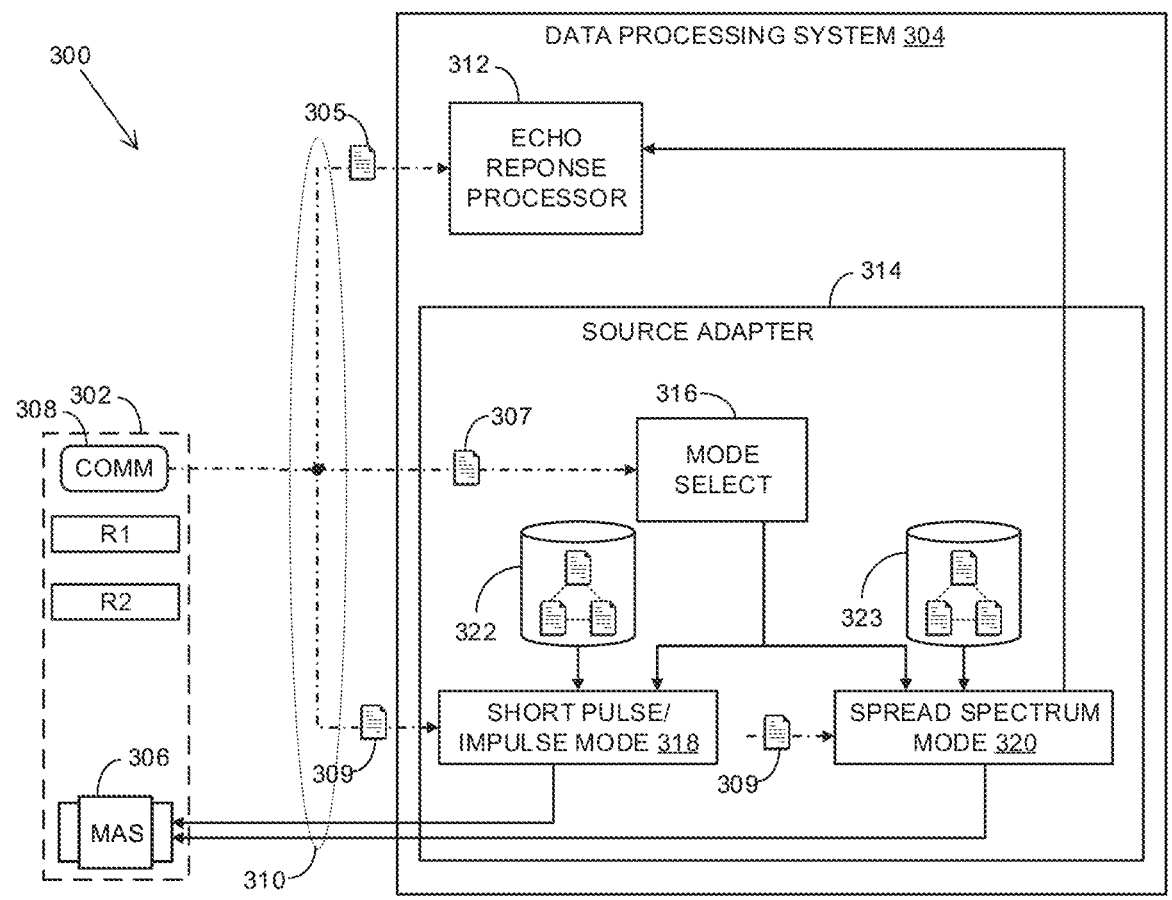
FIG. 3 is a block diagram depicting an acoustic measurement system in accordance with some embodiments.

FIG. 3 is a block diagram depicting an acoustic measurement system 300 in accordance with some embodiments. Acoustic measurement system 300 includes systems and components that may be implemented within and by using the systems and components in the TTCE system 100 depicted in FIG. 1 and/or the well system 200 depicted in FIG. 2. Acoustic measurement system 300 comprises an acoustic logging tool 302 such as may be deployed downhole within the innermost conduit within a multi-layer tubing/encasement configuration such as depicted in FIGS. 1 and 2.

Acoustic logging tool 302 includes a monopole or other type (e.g., dipole) acoustic source 306, a pair of azimuthal receiver arrays R1 and R2, and a communication interface 308. In some embodiments, acoustic logging tool 302 is a discrete unit having a housing in which each of the source, receiver, and communication interface components are contained. In alternate embodiments, the components of acoustic logging tool 302 may be housed or otherwise contained in separate or otherwise individually and independently movable units. During downhole deployment, acoustic logging tool 302 is communicatively coupled with a data processing system (DPS) 304 via a communication link 310.

As depicted in FIG. 2, communication link 310 may be implemented within a wireline cable or otherwise.

Data processing system 304 includes processing and memory components that provide storage and an execution environment for an echo response processor 312 and a source adapter 314. Echo response processor 312 is configured to process acoustic response data 305 received from acoustic logging tool 302. Acoustic response data 305 comprises signal data corresponding to detection of acoustic echo signals by receiver arrays R1 and R2. The acoustic echo signals result from interactions of acoustic source signals within materials and material interfaces at various target points within a borehole. For instance, echo response processor 312 may be configured to determine material properties and structural attribute such as interface bonding characteristics based on the acoustic response data.

Source adapter 314 includes a mode select unit 316 that is configured to process data such as test configuration data 307 received from acoustic logging tool 302 via communication link 310. Test configuration data 307 may include operational data such as current distance/offset between monopole acoustic source 306 and one or both of acoustic receiver arrays R1 and R2. Mode select unit 316 includes any combination of program constructs and data configured to process test configuration data 307 and to select an operating mode for monopole acoustic source 306 based thereon.

Mode select unit 316 is configured to process test configuration data 307 to determine whether a source signal interference condition occurs such as may be caused by insufficient distance/offset between monopole acoustic source 306 and one or both of acoustic receiver arrays R1 and R2. For instance, test configuration data 307 may include acoustic source signal and response signal data that may be processed by mode select unit 316 to identify a source interference condition in which the acoustic source signal induces significant detection interference. In response to determining that the distance/offset is equal to or below a specified threshold, mode select unit 316 selects, such as by program/routine call, spread spectrum mode unit 320. In response to determining that the distance/offset is equal to or above the threshold, mode select unit 316 selects, such as by program/routine call, short pulse mode unit 318.

Short pulse mode unit 318 includes any combination of program constructs and data configured to process data inputs from a pressure wave simulation database 322 and/or test configuration data 309 received from acoustic logging tool 302. Test configuration data 309 may include configuration data such as the current location of monopole acoustic source 306 in absolute terms and/or in relation to one or more target points within the borehole. The target points may be selected by program constructs within monopole acoustic source 306 and/or short impulse mode unit 318. In response to being selected, short pulse mode unit 318 determines an offset of one or more target points from monopole acoustic source 306 and selects pressure wave data in the form of an offset acoustic waveform resulting from a short pulse source from pressure wave simulation database 322 based on the determines offset(s). Short impulse mode unit 318 further includes components configured to generate a reverse time sequence waveform of the offset acoustic waveform, and to generate a corresponding acoustic pulse to be amplified and emitted by monopole acoustic source 306.

Spread spectrum mode unit 320 includes any combination of program constructs and data configured to select a frequency chirp to be generated and transmitted by monopole acoustic source 306. The frequency chirp may be selected by spread spectrum unit 320 from among a set of frequency chirps stored within a frequency chirp database 323. In some embodiment, spread spectrum unit 320 selects a frequency chirp for one or more acoustic source transmissions based, at least in part, on test configuration data 309. Spread spectrum mode unit 320 implements acoustic measurements at target points by emitting the selected frequency chirps and collecting the resultant acoustic responses detected by receiver arrays R1 and R2. Spread spectrum mode unit 320 is further configured to post-process the collected responses to implement signal time compression of the acoustic responses. For instance, spread spectrum mode unit 320 may be configured to cross-correlate each of the detected acoustic responses with the corresponding emitted frequency chirps that were used to generate the responses. The cross-correlation is performed to determine an impulse response for each detected response having an extended dynamic frequency range.

Figure 4:
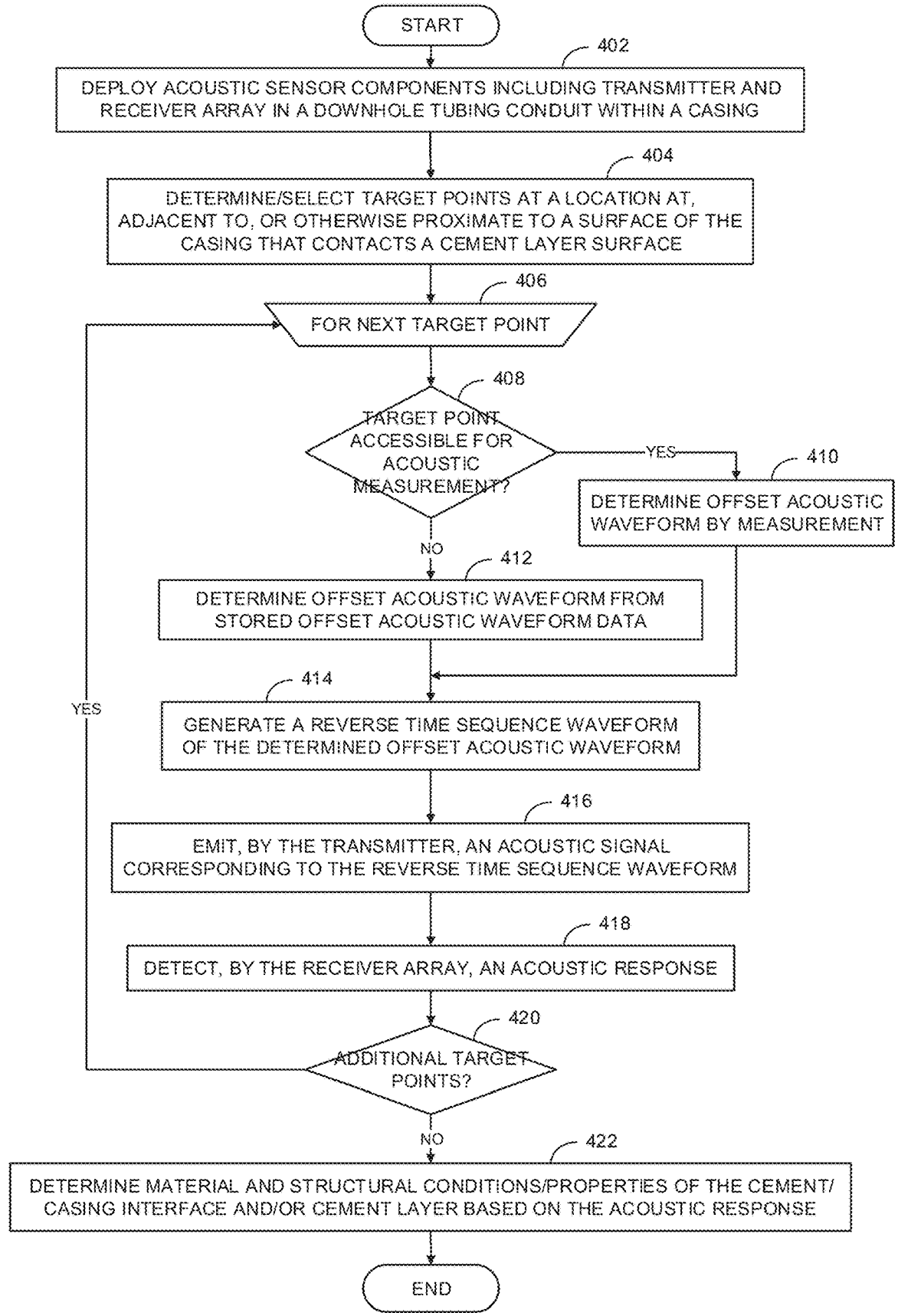
FIG. 4 is a flow diagram depicting operations and functions for performing TTCE using a reverse time sequence of a determined, offset-dependent acoustic waveform, according to some embodiments.

FIG. 4 is a flow diagram depicting operations and functions for performing TTCE using a reverse time sequence of a determined, offset-dependent acoustic waveform, according to some embodiments. The operations and functions may be implemented by one or more of the components depicted and described with reference to FIGS. 1-3. The process begins as shown at block 402 with a well system deploying acoustic sensor components within a downhole tubing conduit, such as a production tubing, within an encased borehole. The acoustic sensor components include an acoustic source and one or more acoustic receivers that may be deployed within a discrete acoustic test tool housing or may be deployed in as independently movable components.

With the acoustic source and other sensor components deployed at a location within the borehole, a source adapter selects or otherwise determines one or more target points within the borehole at block 404. For embodiments in which the system is configured to implement CBL, the source adapter selects one or more target points at, immediately adjacent to, or otherwise proximate to the contact interface between a cement layer and the casing. Additionally or alternatively, the source adapter may select target points within the cement layer that bonds the casing to surrounding subterranean borehole surface material. Following or substantially concurrently with target point selection, a next target point acoustic measurement cycle begins at block 406.

One or more of the selected target points may be accessible such as by an acoustic receiver prior to or during acoustic measurement testing. For instance, a target point may be accessible by an acoustic receiver in the borehole itself during or prior to the acoustic measurement cycle, or may be otherwise accessible in a representative physical simulation environment such as in a laboratory. If, as shown at blocks 408 and 410, a receiver accessibility exists in situ within the borehole or via physical simulation, a offset acoustic waveform is determined for the target point by actual or simulated detection of the offset acoustic waveform. Otherwise, as shown at blocks 408 and 412, the offset acoustic waveform is determined by simulation modeling such as by finite-difference time domain (FDTD) simulation data. The offset acoustic waveform is determined from the simulation data as a function of the acoustic source signal, typically an impulse or short pulse, and as a function of the offset of the target point from the acoustic source.

At block 414, a short pulse unit generates a reverse time sequence waveform of the determined offset acoustic waveform for a target point. The short pulse unit may be included within the downhole acoustic source device, may be a component of a remote data processing system such as shown in FIG. 3, or may comprise sub-components distributed therebetween. The generated reverse time sequence waveform is used or modified to be used as an acoustic source signal that to be amplified and emitted from the acoustic source (block 416). For example, the reverse time sequence waveform may be stored in a waveform generator for the acoustic source as an acoustic source pulse by normalizing the amplitudes of the frequency components of the reverse time sequence waveform. The source pulse may also or alternatively be conditioned by various filtering, windowing, tapering, smoothing and/or other waveform processing techniques.

The emitted/transmitted acoustic pulse traverses various material layers within the borehole including metallic tubing and casing layers as well as interleaved annular fluid layers and a cement layer. Based on the selected target point offset, the acoustic pulse reaches the target pulse as a combination of pressure wave components that converge at the target point to maximize the amplitude of the corresponding acoustic response. At block 418, the acoustic response is detected by an acoustic receiver such as one or more receivers in an azimuthal receiver array and a next cycle is commenced as shown at block 420 and with control returning to block 406 if additional target points are to be acoustically measured. Otherwise, the process ends following collection of acoustic measurements from the target points of interest and the acoustic measurement data used at block 422 to determine material and structural conditions and properties of the cement/casing interface in the case of CBL testing.

Figure 5:
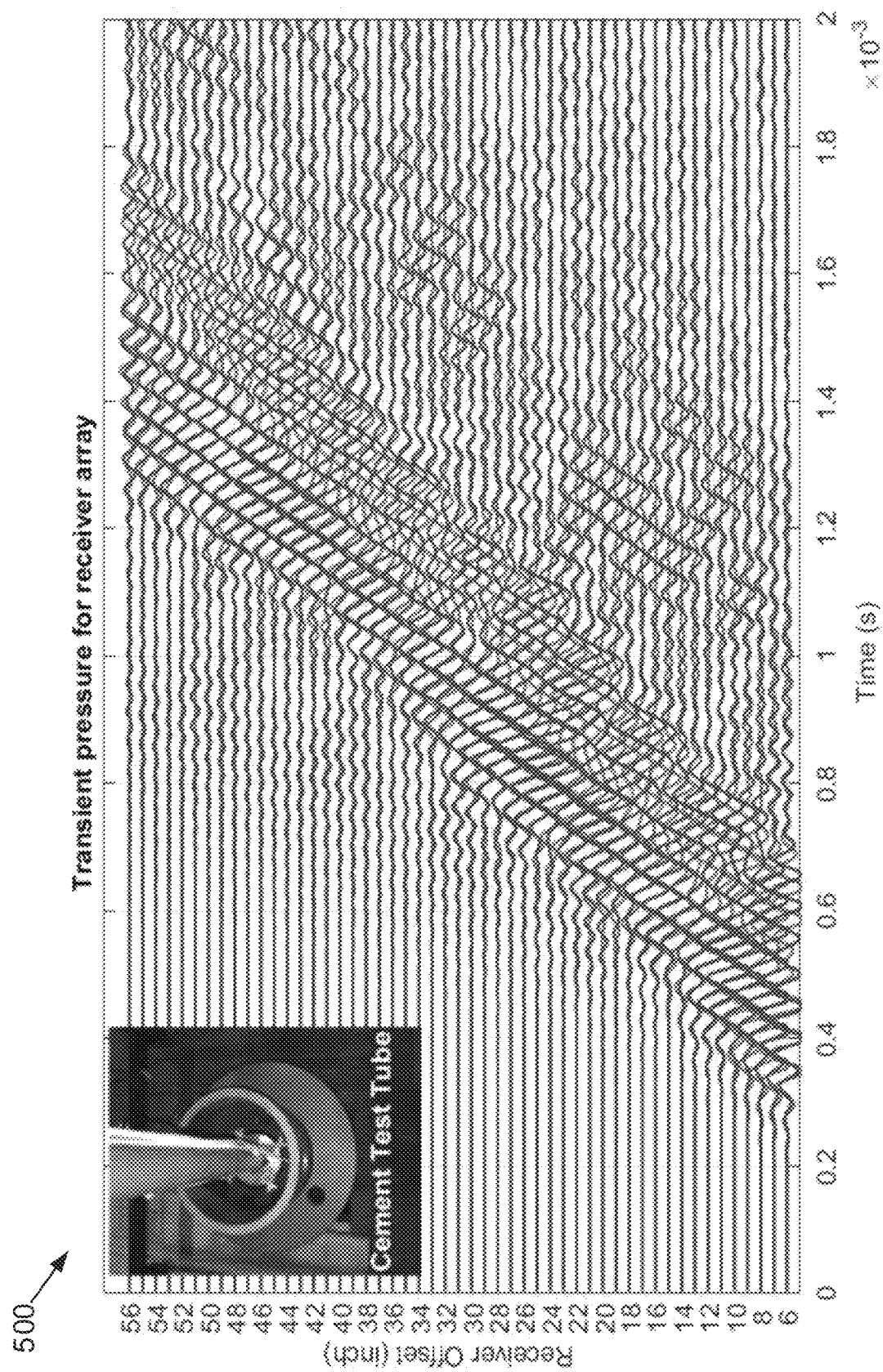
FIG. 5 depicts an example TTCE laboratory set superimposed onto a graph of measured acoustic waveforms generated in a borehole by an acoustic source and receiver array plotted against corresponding model simulated acoustic waveforms, according to some embodiments.

To further illustrate characteristics of the data accessed such as at block 412 (FIG. 4) by short pulse mode unit 318 within database 322 (FIG. 3), FIG. 5 depicts pressure wave simulation data within a graph 500 that depicts pressure wave amplitude over time (x-axis) and over offset from source distance (y-axis). The simulation data includes an example TTCE laboratory set in the upper left corner of graph 500 that illustrates measured borehole waveforms generated by a borehole source and receiver array plotting against corresponding simulation waveforms. Graph 500 includes measured borehole waveforms (shown as a lighter shade) generated and detected by an acoustic source and receiver array plotted against corresponding finite-difference time domain (FDTD) simulations (shown as a darker shade). As shown, acoustic pressure waveforms may be generated that are nearly identical to FDTD code predictions. By utilizing this similarity, offset acoustic waveforms may be simulated at most otherwise inaccessible target points within a borehole including locations inside or outside inner tubing and/or casing. In this manner, the pressure or particle displacement, velocity, acceleration, and other offset acoustic waveform metrics can be determined at any target point for a source acoustic pulse. The reverse time sequence signals can be used as the input to the driving amplifier of a borehole transmitter in order to enhance the pressure or particle response at a destinated receiving location (e.g., a selected target point).

Figure 6:
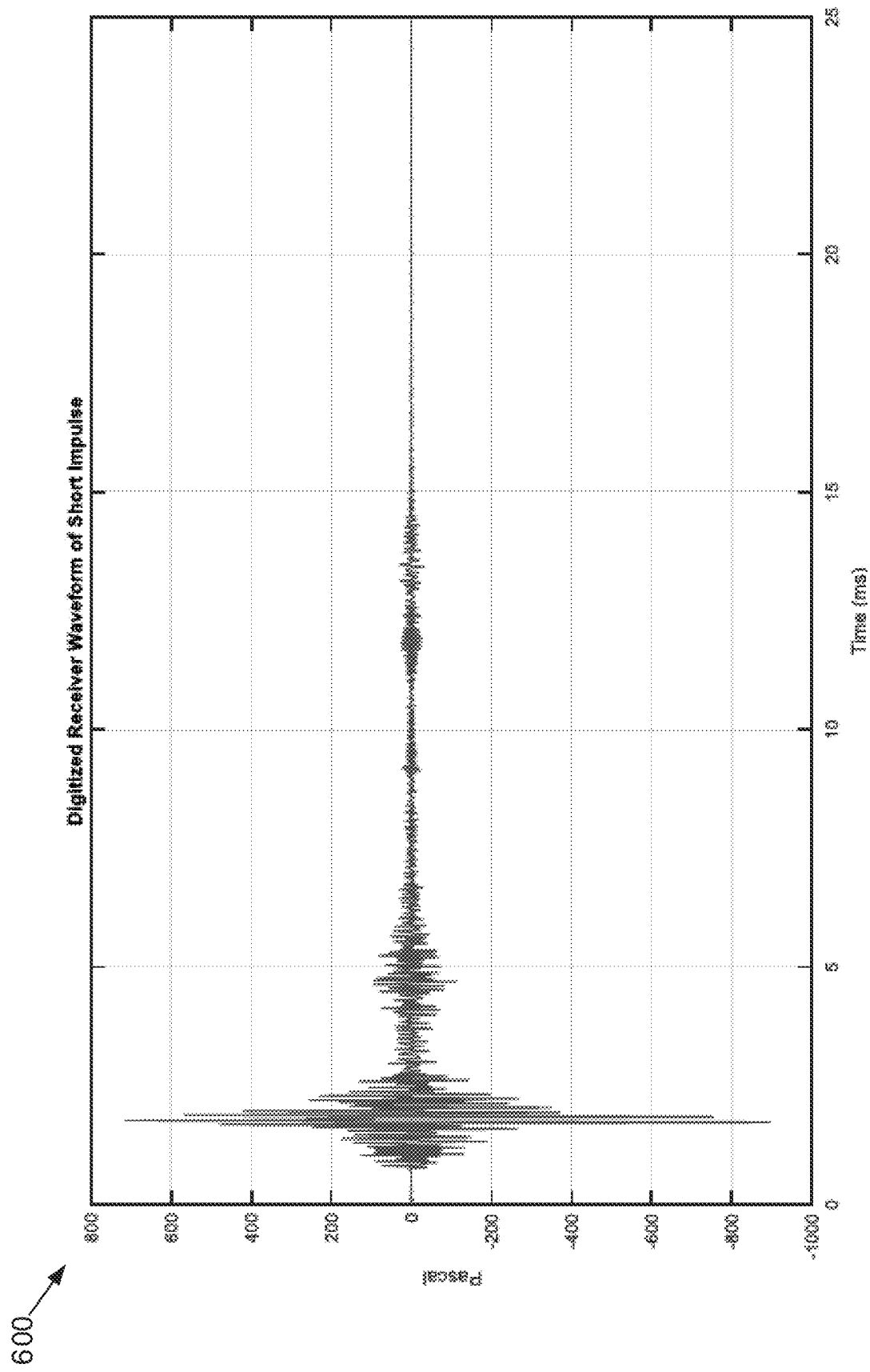
FIG. 6 is an example graph illustrating an offset acoustic waveform that may be determined from the waveform data depicted in FIG. 5, according to some embodiments.

To further illustrate characteristics of the offset acoustic waveform that may be measured or determined via the simulation data shown in FIG. 5, FIG. 6 depicts an offset acoustic waveform in digitized graphical form. More specifically, FIG. 6 is an example graph 600 illustrating an offset acoustic waveform that originates as an acoustic pulse from an acoustic source and that may be determined as shown at block 412 of FIG. 4 from the waveform data depicted in FIG. 5.

Figure 7:
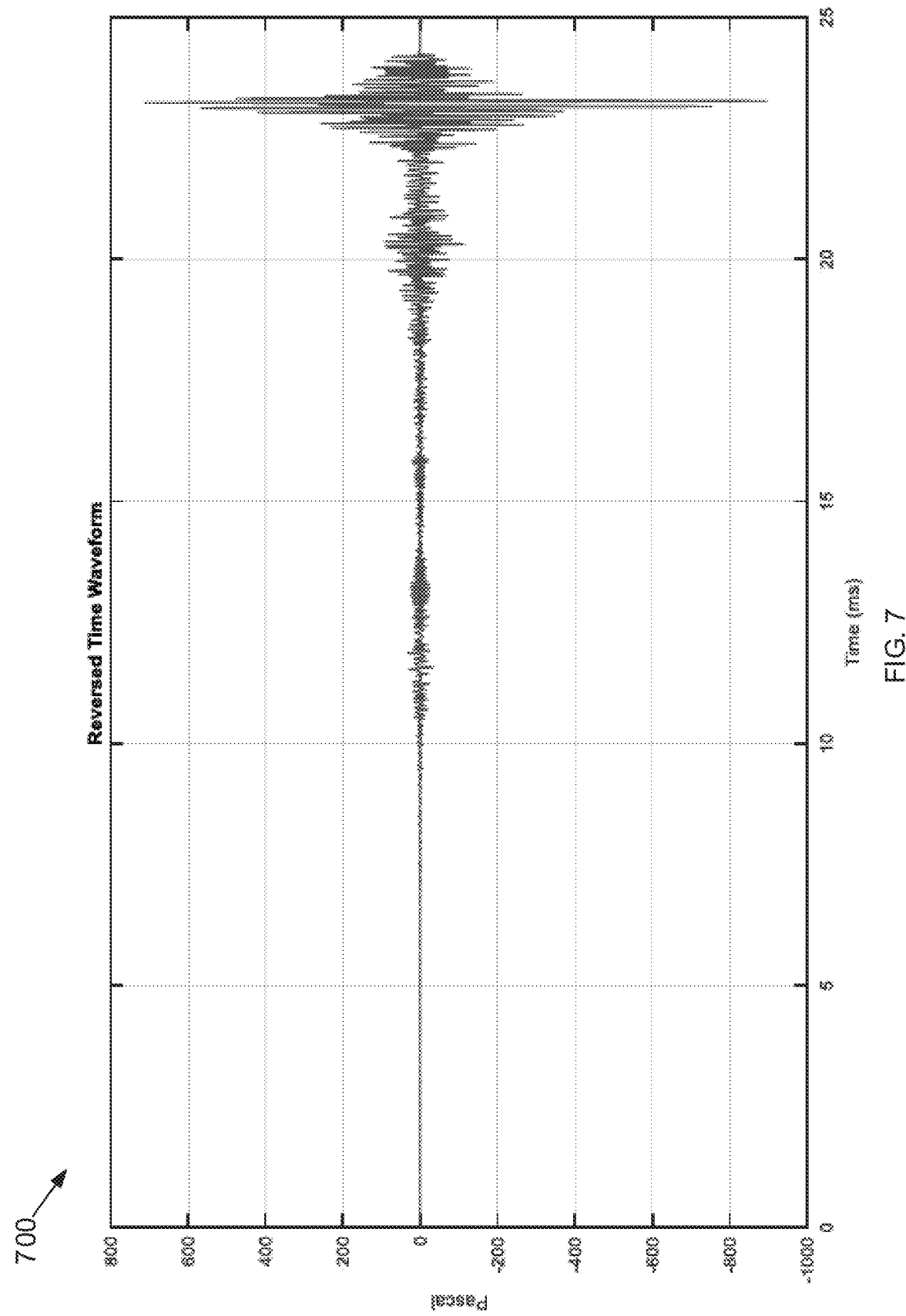
FIG. 7 is an example graph depicting a reverse time sequence waveform of the offset acoustic waveform shown in FIG. 6.

As depicted and described with reference to block 414 of FIG. 4, the time sequence of the offset acoustic waveform shown in FIG. 5 is reversed such as by a short pulse mode unit. For example, FIG. 7 depicts an example graph 700 of a reverse time sequence waveform of the offset acoustic waveform of FIG. 6. The reverse time sequence waveform may be stored in a waveform function generator by normalizing its amplitude to form an acoustic source pulse. The reverse time sequence waveform may also or alternatively be reconditioned with filtering, windowing, tapering, smoothing or any other signal processing techniques to pre-condition a corresponding source pulse before being stored.

Figure 8:
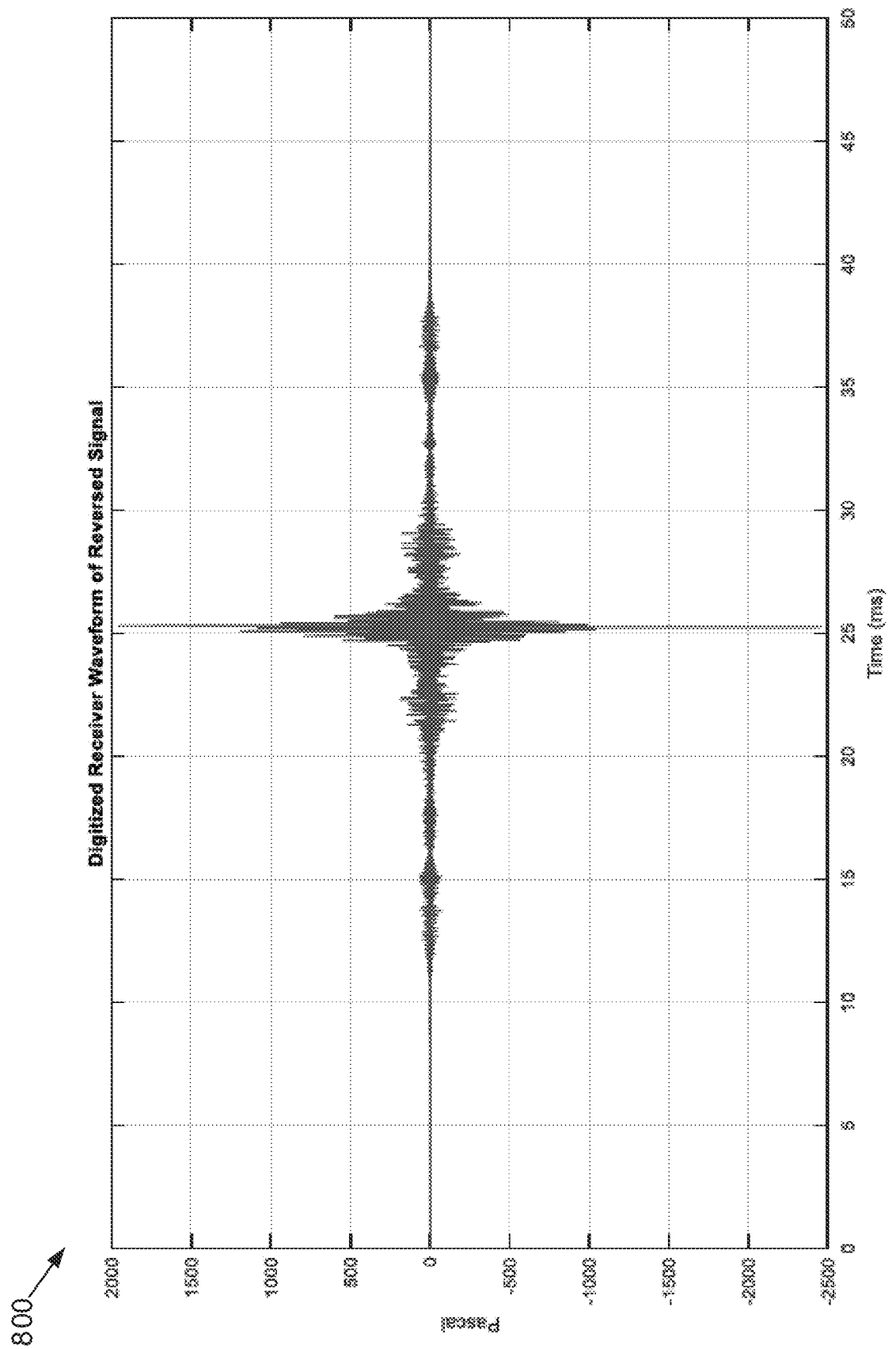
FIG. 8 is an example graph illustrating an offset acoustic waveform induced at a selected offset target point by an acoustic source pulse generated from the reverse time sequence waveform shown in FIG. 7.

To further illustrate characteristics of the offset acoustic waveform incident at the target point as induced by the acoustic pulse, FIG. 8 depicts an example graph 800 illustrating an offset acoustic waveform induced at a selected offset target point by an acoustic source pulse generated from the reverse time sequence waveform shown in FIG. 8. Comparing the peak pressure amplitude between the waveforms in FIGS. 6 and 8, several factors of pressure amplitude boost occur at the same receiving location (i.e., the same target point). The pressure response represented by graph 800 may be equal to the cross correlation between the new firing pulse corresponding to the reverse time sequence waveform in FIG. 7 with the offset acoustic waveform in FIG. 6.

Based on the linear acoustic superposition, this transmitter-receiver pair signal enhancement method depicted and described with reference to FIGS. 1-8 may extended to a multiple acoustic source configuration to significantly boost the overall acoustic pressure at a target point location. An acoustic source firing time delay may be applied according to its distance to the corresponding target point in order to align the arriving amplitude peaks from each of the transmitter and receiver pairs. In this manner, the peak pressure signals delivered by different transmitter-receiver pairs can arrive at the same time to add up constructively. Therefore, the pressure improvement at this designated target point(s) are linearly proportional to the number of contributing transmitters.

Some embodiments include a through tubing cement evaluation measurement signal enhancement method to address the dynamic range issue if a distance between the transmitter and receiver is within a defined threshold (e.g., very close). The direct waves coming from the transmitter to the receiver can be very large. These direct waves do not carry the cement-casing reflection information which is an order to two order of magnitude smaller in amplitude. In order to extract the reflection information the direct wave components can be extracted from the recorded signal.

Increasing the firing transmitter power can often not be helpful due to the limit digitization dynamic range. Therefore, in order to improve the recording signal dynamic range without increasing the number of bits in the digitizer a spread spectrum technique can be used by firing the transmitter in long sequence of frequency chirps. Signal compression can be performed in the processing step to obtain an extended dynamic range to improve extracting those embedded smaller signals.

Figure 9:
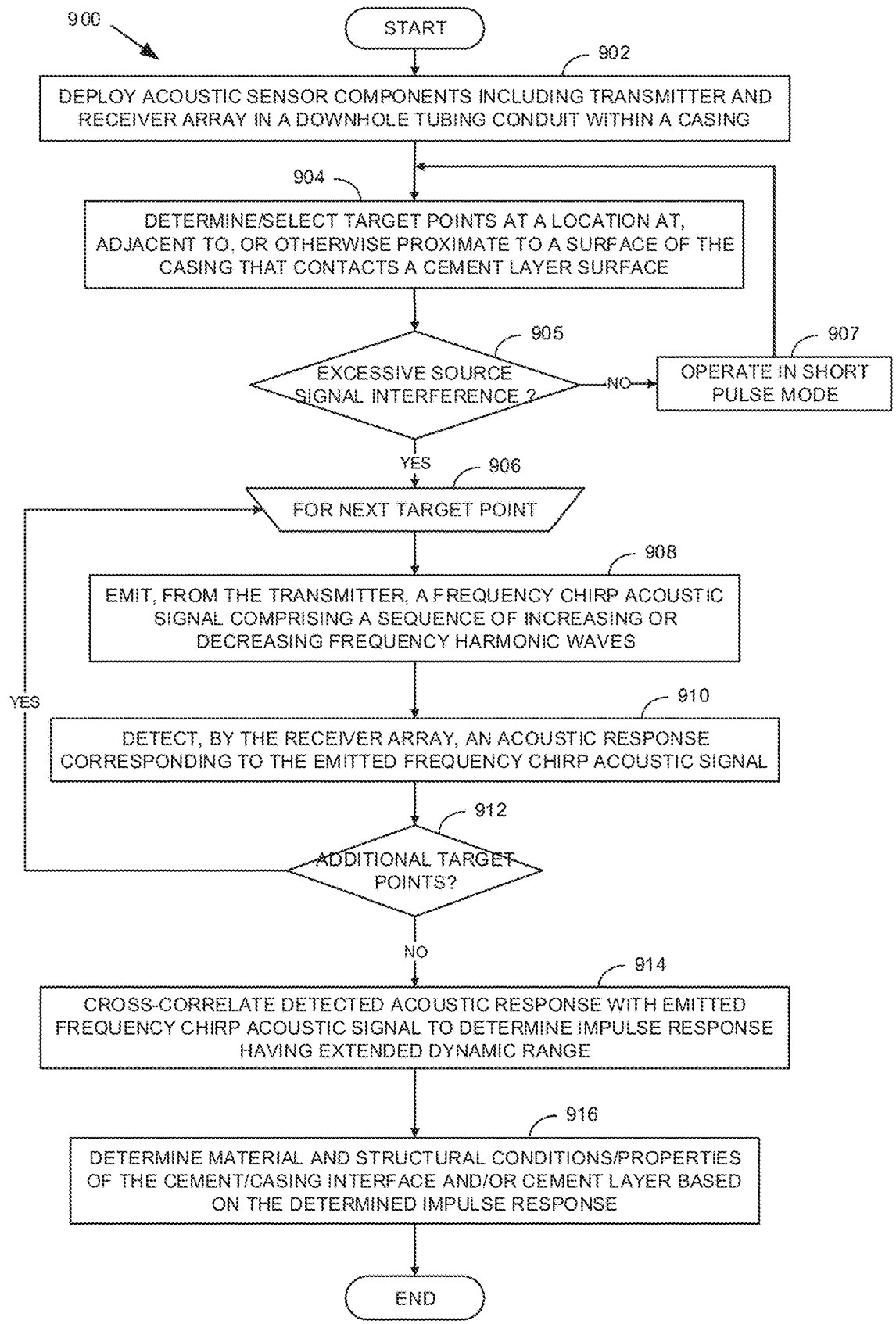
FIG. 9 is a flow diagram illustrating operations and functions for performing TTCE using frequency chirps such as for acoustic measurement configurations in which the distance between the transmitter and receiver is below a threshold, according to some embodiments.

FIG. 9 is a flow diagram illustrating operations and functions for performing TTCE using frequency chirps such as for acoustic measurement configurations in which the distance between the transmitter and receiver is below a threshold, according to some embodiments. The operations and functions may be implemented by one or more of the components depicted and described with reference to FIGS.

1-3. The process begins as shown at block 902 with a well system deploying acoustic sensor components within a downhole tubing conduit, such as a production tubing, within an encased borehole. The acoustic sensor components include an acoustic source and one or more acoustic receivers that may be deployed within a discrete acoustic test tool housing or may be deployed in as independently movable components.

With the acoustic source and other sensor components deployed at a location within the borehole, a source adapter selects or otherwise determines one or more target points within the borehole at block 904. For embodiments in which the system is configured to implement CBL, the source adapter selects one or more target points at, immediately adjacent to, or otherwise proximate to the contact interface between a cement layer and the casing. Additionally or alternatively, the source adapter may select target points within the cement layer that bonds the casing to surrounding subterranean borehole surface material.

At block 905, the TTCE system determines whether the acoustic source is substantially interfering with acoustic responses detected by one or more of the acoustic receivers. In some embodiments, the determination at block 905 may be based, at least in part, on the noise evaluations of detected acoustic responses such as signal-to-noise ratios. The determination at block 905 may also be made presumptively, based on the distance between the acoustic sensor and one or more of the acoustic receivers. For instance, the system may determine that the source is/will interfere with the detected signals based on the distance between the acoustic source and an acoustic receiver being below a specified threshold. In response to determining by source-to-receiver distance or otherwise that there is/will be no substantial source interference, control passes to block 907 with the system commencing or continuing operation in the short pulse mode described with reference to FIG. 4.

In response to determining substantial source interference at block 905, the system continues with or switches to operating in spread spectrum mode and a next target point acoustic measurement cycle begins at block 906. At block 908, a frequency chirp is emitted/transmitted as a source signal by the downhole deployed acoustic source. The frequency chirp is an acoustic signal comprising a sequence of harmonic waves having increasing frequency or decreasing frequency over time.

At block 910, one or more of the acoustic receivers detects an acoustic response signal corresponding to the emitted frequency chirp. The detected acoustic response is recorded such as by the receiver electronics and/or within a data processing system communicatively coupled with the receiver. If additional target points remain as determined at block 912, control passes back to block 906 to repeat the detection and response recording sequence for another target point. When all target points have been acoustically measured using the frequency chirp, control passes to block 914 with the post-processing of the detected acoustic responses to implement signal time compression to extract the useful echo reflection information from the detected responses. The signal time compression of the acoustic signal is performed to generate an impulse response comprising an extended dynamic range signal. In the depicted embodiment, the spread spectrum mode unit implements signal time compression of the detected responses by cross-correlating each acoustic response with the corresponding frequency chirp that induced the response to determine impulse responses each corresponding to one of the detected responses and each having an extended dynamic frequency range. The process ends at block 916 following conversion of the detected responses to extended range impulse responses with the system determining material and structural conditions and properties of the cement/casing interface in the case of CBL testing based on the impulse responses.

Figure 10:
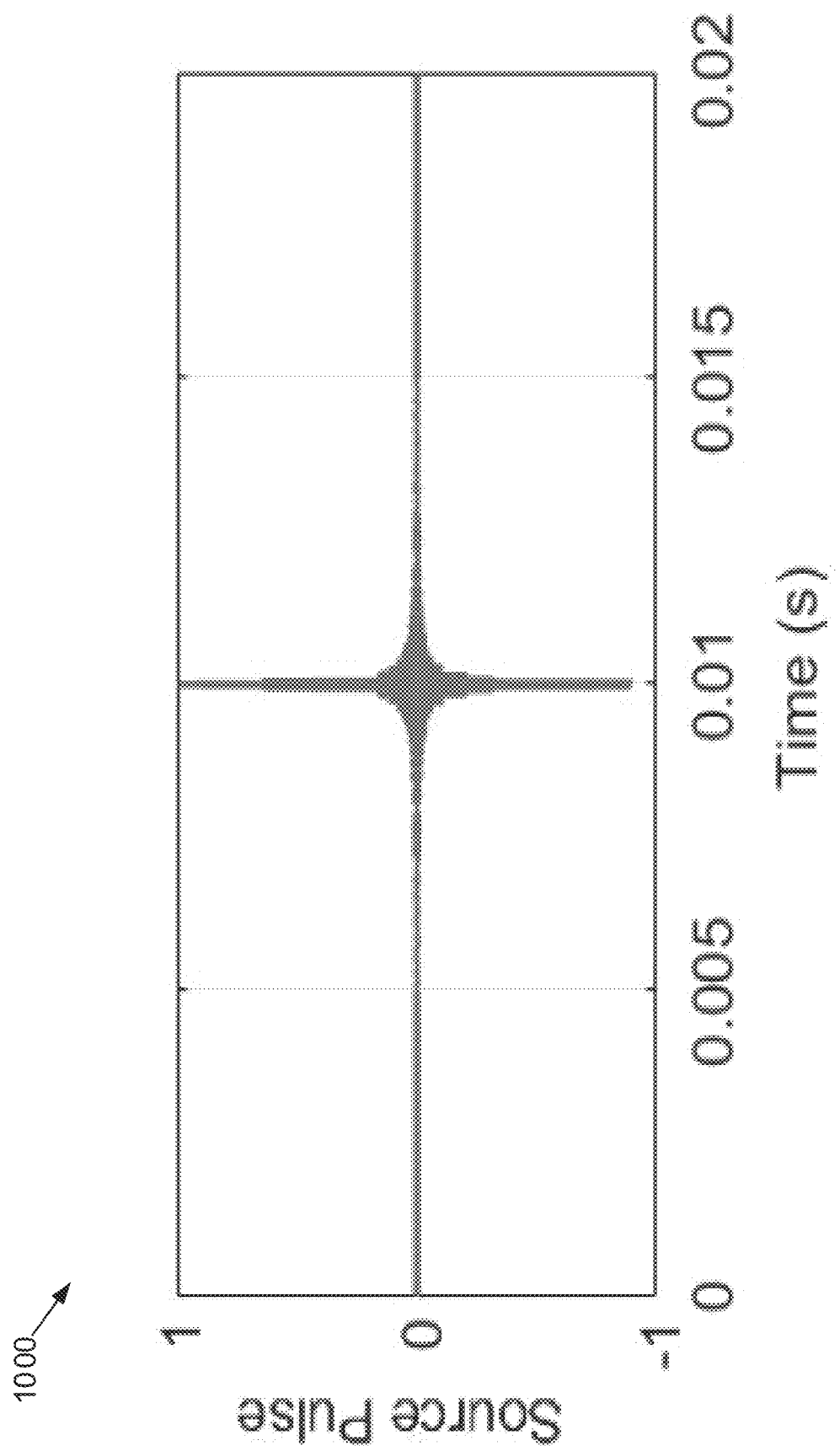
FIG. 10 depicts an example graph of a short source pulse from a transmitter using the example system of FIG. 3, according to some embodiments.
Figure 11:
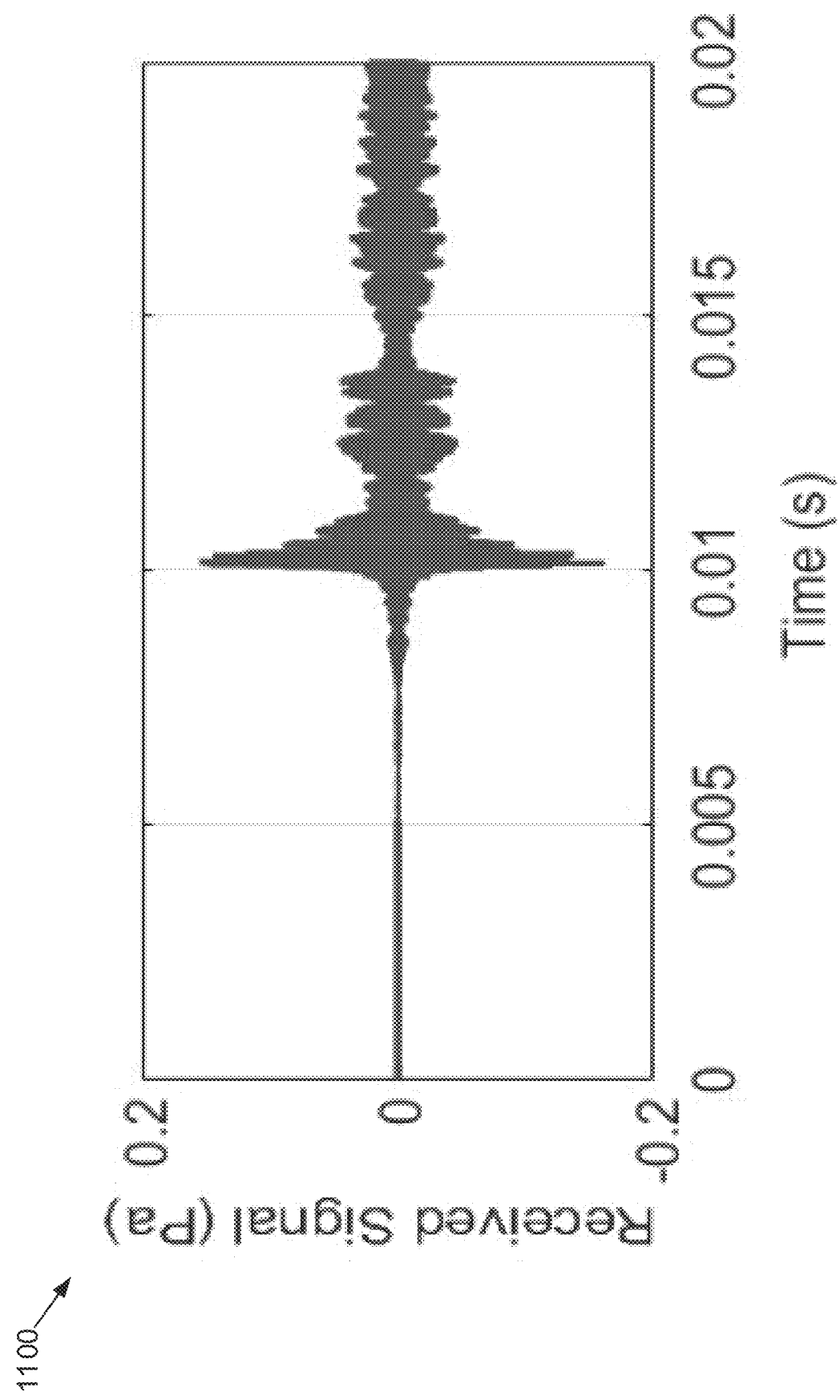
FIG. 11 depicts an example graph of a digitized receiver waveform detected in response to the short source pulse depicted in FIG. 10, according to some embodiments.

To further illustrate spread spectrum mode operation, FIG. 10 depicts an example graph 1000 of a simulated short source pulse emitted by an acoustic source. The short firing pulse depicted in FIG. 10 has a maximized driving voltage without saturating the received response signal FIG. 11 depicts an example graph 1100 of an acoustic response waveform detected by an acoustic receiver in response to the short source pulse depicted in FIG. 10.

Figure 12:
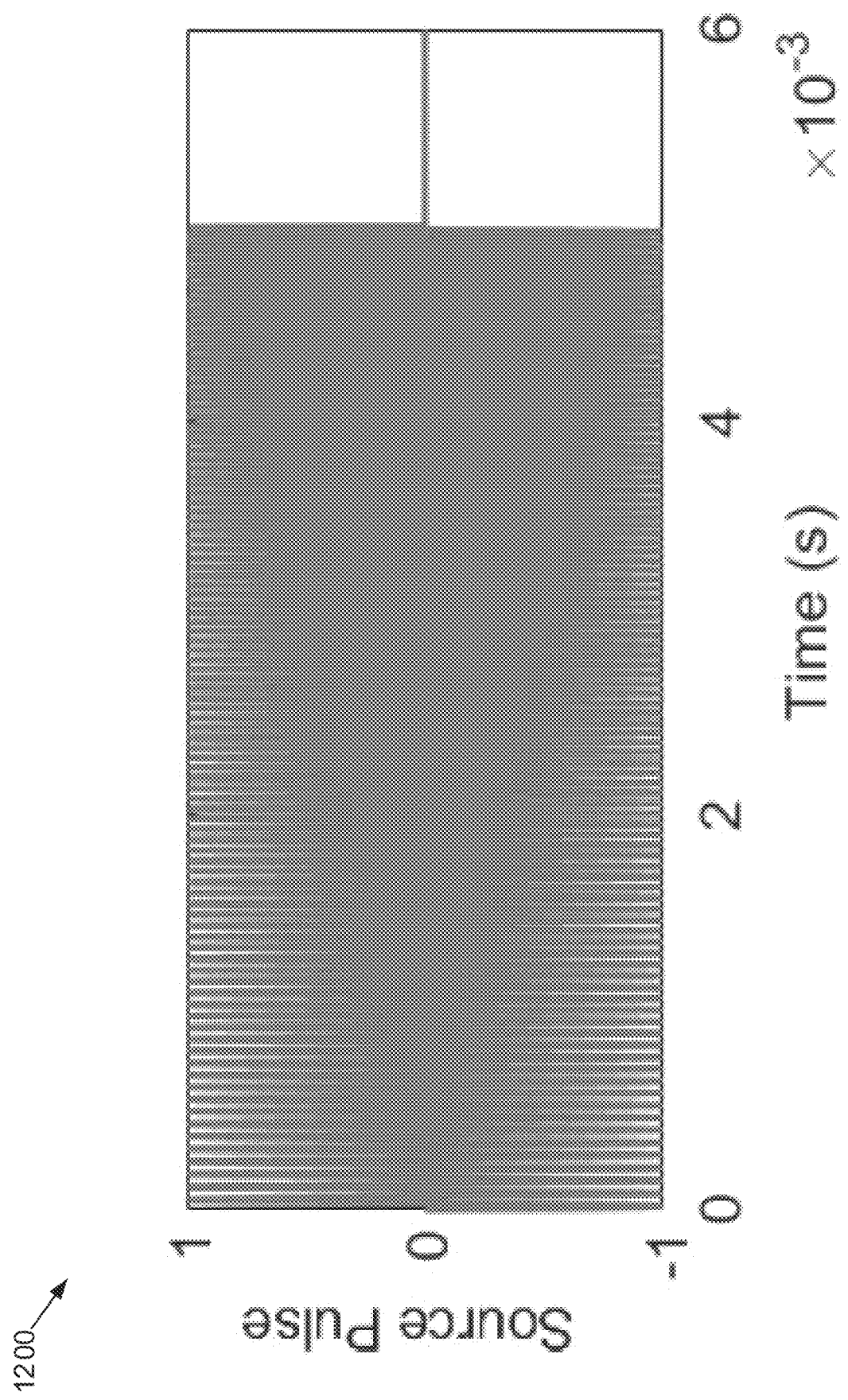
FIG. 12 depicts an example graph of a chirp driving source pulse, according to some embodiments.
Figure 13:
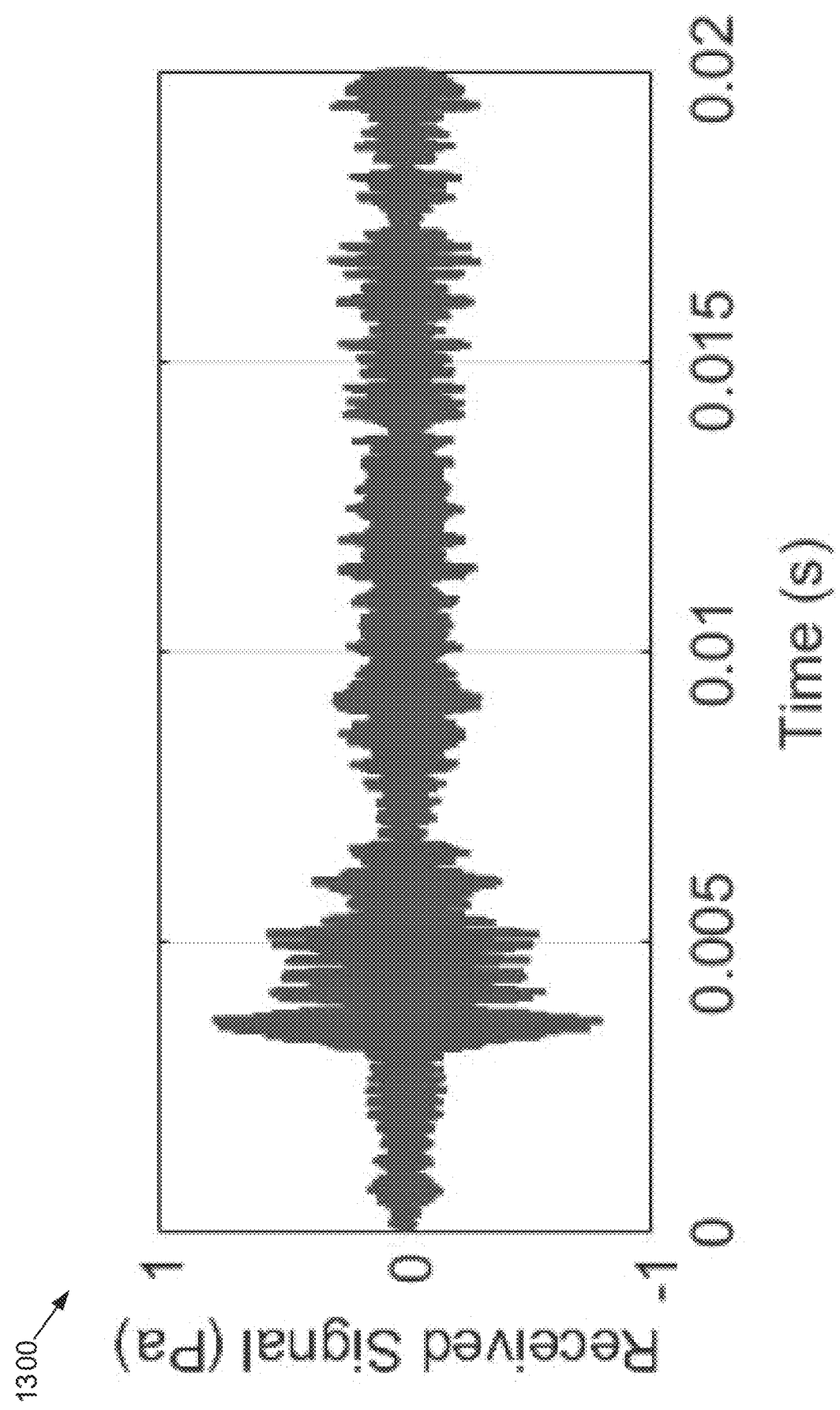
FIG. 13 depicts an example graph of a digitized receiver waveform detected in response to the chirp driving source pulse depicted in FIG. 12, according to some embodiments.
Figure 14:
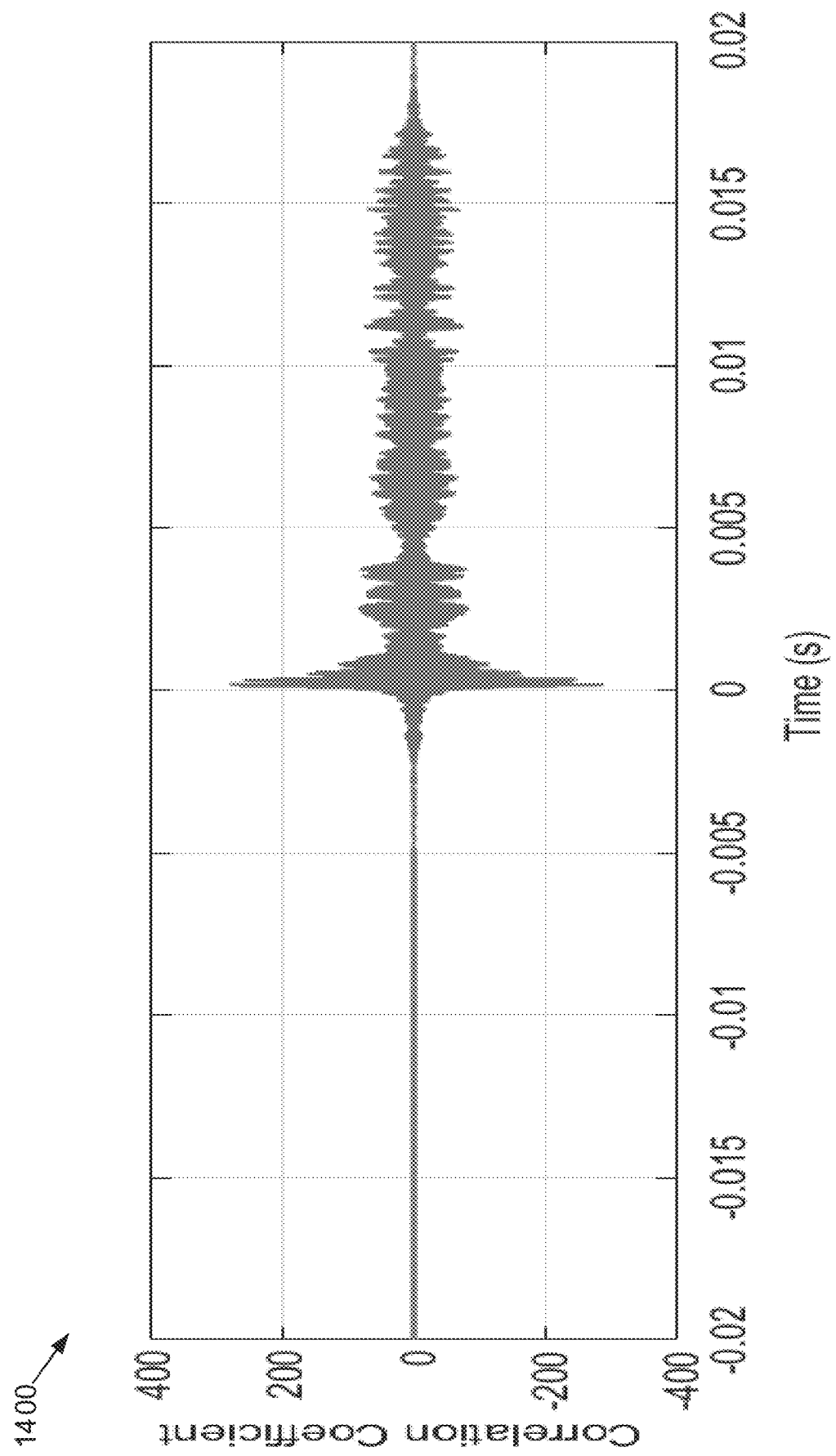
FIG. 14 depicts an example graph of the receiver response after cross correlating the waveform in FIG. 13 with the chirp driving source pulse of FIG. 12, according to some embodiments.

FIG. 12 depicts an example graph 1200 of an acoustic source signal emitted as a frequency chirp from an acoustic source. FIG. 13 depicts an example graph 1300 of an acoustic response waveform detected in response to the frequency chirp source signal depicted in FIG. 12. FIG. 14 depicts an example graph 1400 of the receiver response after cross correlating the waveform in FIG. 14 with the frequency chirp source signal of FIG. 12. As shown, the signal range is increased from 0.2 Pascal (Pa) to 300 Pa by a factor of 1760. Therefore, the signal dynamic range is improved by an order of 1000.

OTHER EXAMPLE APPLICATIONS

Figure 15:
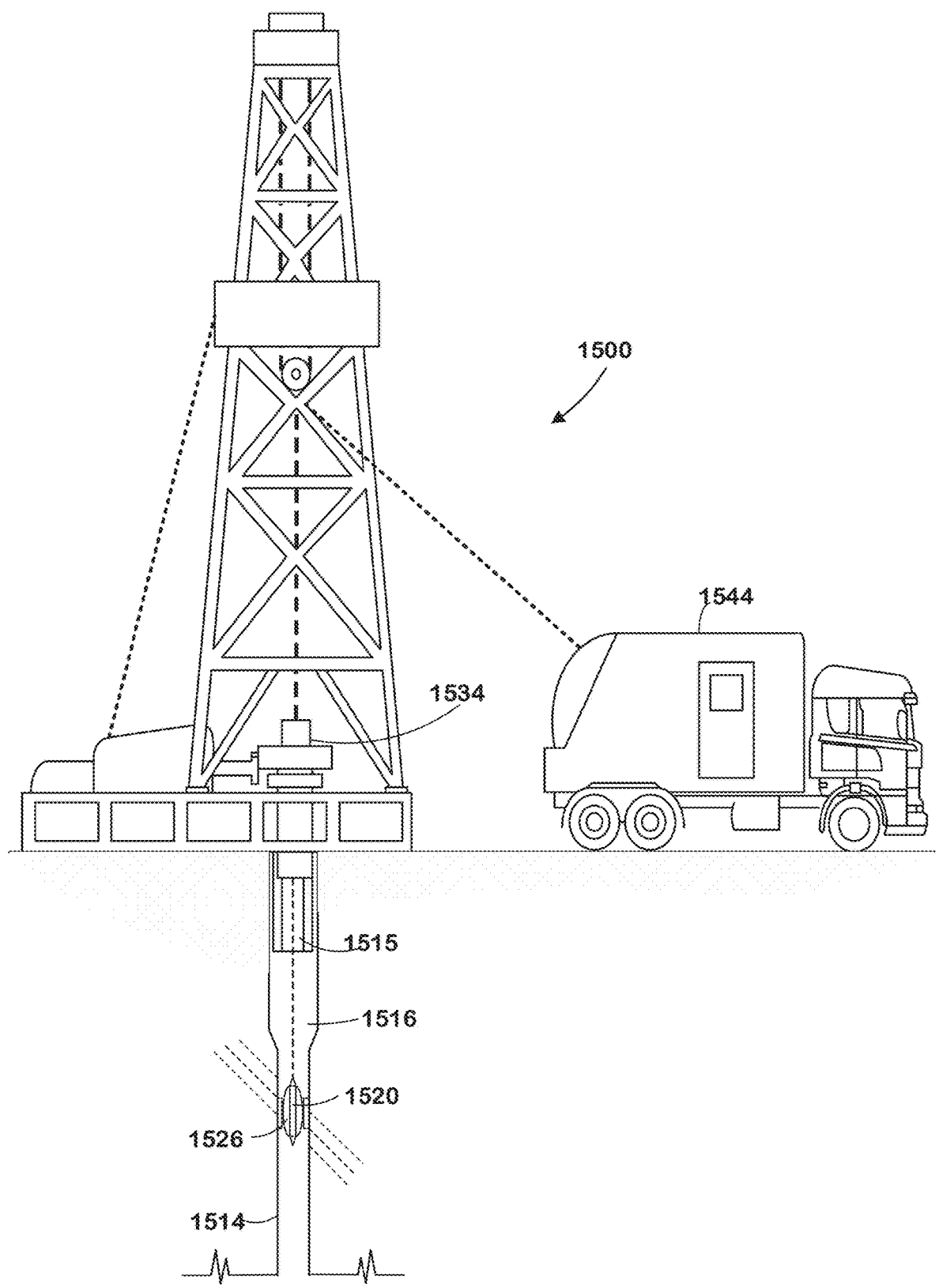
FIG. 15 depicts a schematic diagram of a wireline system, according to some embodiments.

While described herein are in reference to a cased borehole, some embodiments can be used in other types of downhole systems to perform the signal processing as described herein. For example, FIG. 15 depicts a schematic diagram of a wireline system, according to some embodiments. A system 1500 can be used in an illustrative logging environment with a drillstring removed, in accordance with some embodiments of the present disclosure.

Subterranean operations may be conducted using a wireline system 1520 once the drillstring has been removed, though, at times, some or all of the drillstring may remain in a borehole 1514 during logging with the wireline system 1520. The wireline system 1520 may include one or more logging tools 1526 that may be suspended in the borehole 1514 by a conveyance 1515 (e.g., a cable, slickline, or coiled tubing). The logging tool 1526 may be communicatively coupled to the conveyance 1515. The conveyance 1515 may contain conductors for transporting power to the wireline system 1520 and telemetry from the logging tool 1526 to a logging facility 1544. Alternatively, the conveyance 1515 may lack a conductor, as is often the case using slickline or coiled tubing, and the wireline system 1520 may contain a control unit 1534 that contains memory, one or more batteries, and/or one or more processors for performing operations and storing measurements.

In certain embodiments, the control unit 1534 can be positioned at the surface, in the borehole (e.g., in the conveyance 1515 and/or as part of the logging tool 1526) or both (e.g., a portion of the processing may occur downhole and a portion may occur at the surface). The control unit 1534 may include a control system or a control algorithm. In certain embodiments, a control system, an algorithm, or a set of machine-readable instructions may cause the control unit 1534 to generate and provide an input signal to one or more elements of the logging tool 1526, such as the sensors along the logging tool 1526. The input signal may cause the sensors to be active or to output signals indicative of sensed properties. The logging facility 1544 (shown in FIG. 15 as a truck, although it may be any other structure) may collect measurements from the logging tool 1526, and may include computing facilities for controlling, processing, or storing the measurements gathered by the logging tool 1526. The computing facilities may be communicatively coupled to the logging tool 1526 by way of the conveyance 1515 and may operate similarly to the control unit 1534. In certain example embodiments, the control unit 1534, which may be located in logging tool 1526, may perform one or more functions of the computing facility.

The logging tool 1526 includes a mandrel and a number of extendible arms coupled to the mandrel. One or more pads are coupled to each of the extendible arms. Each of the pads have a surface facing radially outward from the mandrel. Additionally, at least sensor disposed on the surface of each pad. During operation, the extendible arms are extended outwards to a wall of the borehole to extend the surface of the pads outward against the wall of the borehole. The sensors of the pads of each extendible arm can detect image data to create captured images of the formation surrounding the borehole.

Figure 16:
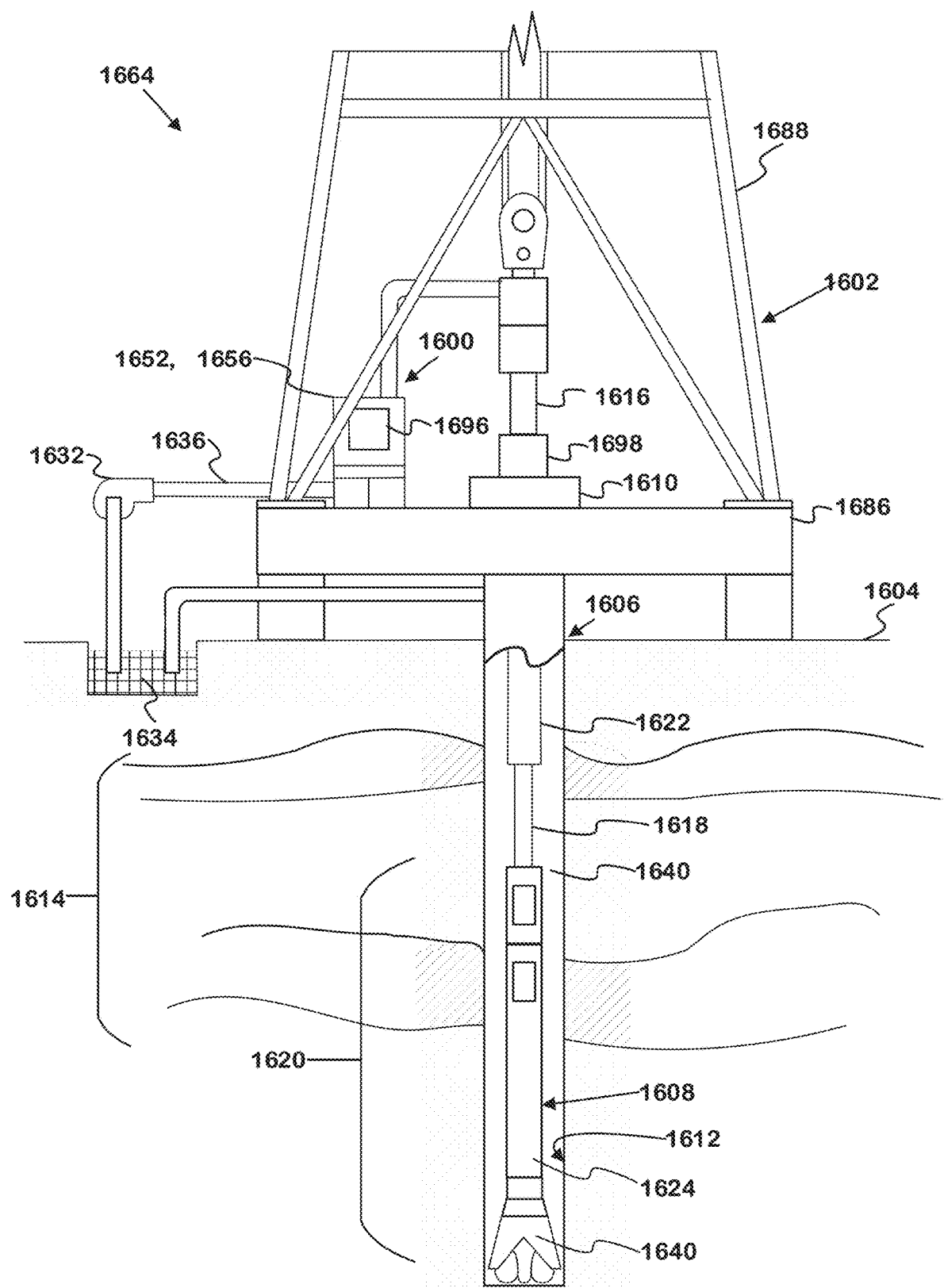
FIG. 16 depicts a schematic diagram of a drilling rig system, according to some embodiments.

Some embodiments can be incorporated into a drilling application. To illustrate, FIG. 16 depicts a schematic diagram of a drilling rig system, according to some embodiments. For example, in FIG. 16 it can be seen how a system 1664 may also form a portion of a drilling rig 1602 located at the surface 1604 of a well 1606. Drilling of oil and gas wells is commonly carried out using a string of drill pipes connected together so as to form a drilling string 1608 that is lowered through a rotary table 1610 into a wellbore or borehole 1612. Here a drilling platform 1686 is equipped with a derrick 1688 that supports a hoist.

The drilling rig 1602 may thus provide support for the drill string 1608. The drill string 1608 may operate to penetrate the rotary table 1610 for drilling the borehole 1612 through subsurface formations 1614. The drill string 1608 may include a Kelly 1616, drill pipe 1618, and a bottom hole assembly 1620, perhaps located at the lower portion of the drill pipe 1618. The bottom hole assembly 1620 may include drill collars 1622, a down hole tool 1624, and a drill bit 1626. The drill bit 1626 may operate to create a borehole 1612 by penetrating the surface 1604 and subsurface formations 1614. The down hole tool 1624 may comprise any of a number of different types of tools including MWD tools, LWD tools, and others.

During drilling operations, the drill string 1608 (perhaps including the Kelly 1616, the drill pipe 1618, and the bottom hole assembly 1620) may be rotated by the rotary table 1610. In addition to, or alternatively, the bottom hole assembly 1620 may also be rotated by a motor (e.g., a mud motor) that is located down hole. The drill collars 1622 may be used to add weight to the drill bit 1626. The drill collars 1622 may also operate to stiffen the bottom hole assembly 1620, allowing the bottom hole assembly 1620 to transfer the added weight to the drill bit 1626, and in turn, to assist the drill bit 1626 in penetrating the surface 1604 and subsurface formations 1614.

During drilling operations, a mud pump 1632 may pump drilling fluid (sometimes known by those of ordinary skill in the art as "drilling mud") from a mud pit 1634 through a hose 1636 into the drill pipe 1618 and down to the drill bit 1626. The drilling fluid can flow out from the drill bit 1626 and be returned to the surface 1604 through an annular area 1640 between the drill pipe 1618 and the sides of the borehole 1612. The drilling fluid may then be returned to the mud pit 1634, where such fluid is filtered. In some embodiments, the drilling fluid can be used to cool the drill bit 1626, as well as to provide lubrication for the drill bit 1626 during drilling operations. Additionally, the drilling fluid may be used to remove subsurface formation 1614 cuttings created by operating the drill bit 1626. It is the images of these cuttings that many embodiments operate to acquire and process.

EXAMPLE COMPUTER

Figure 17:
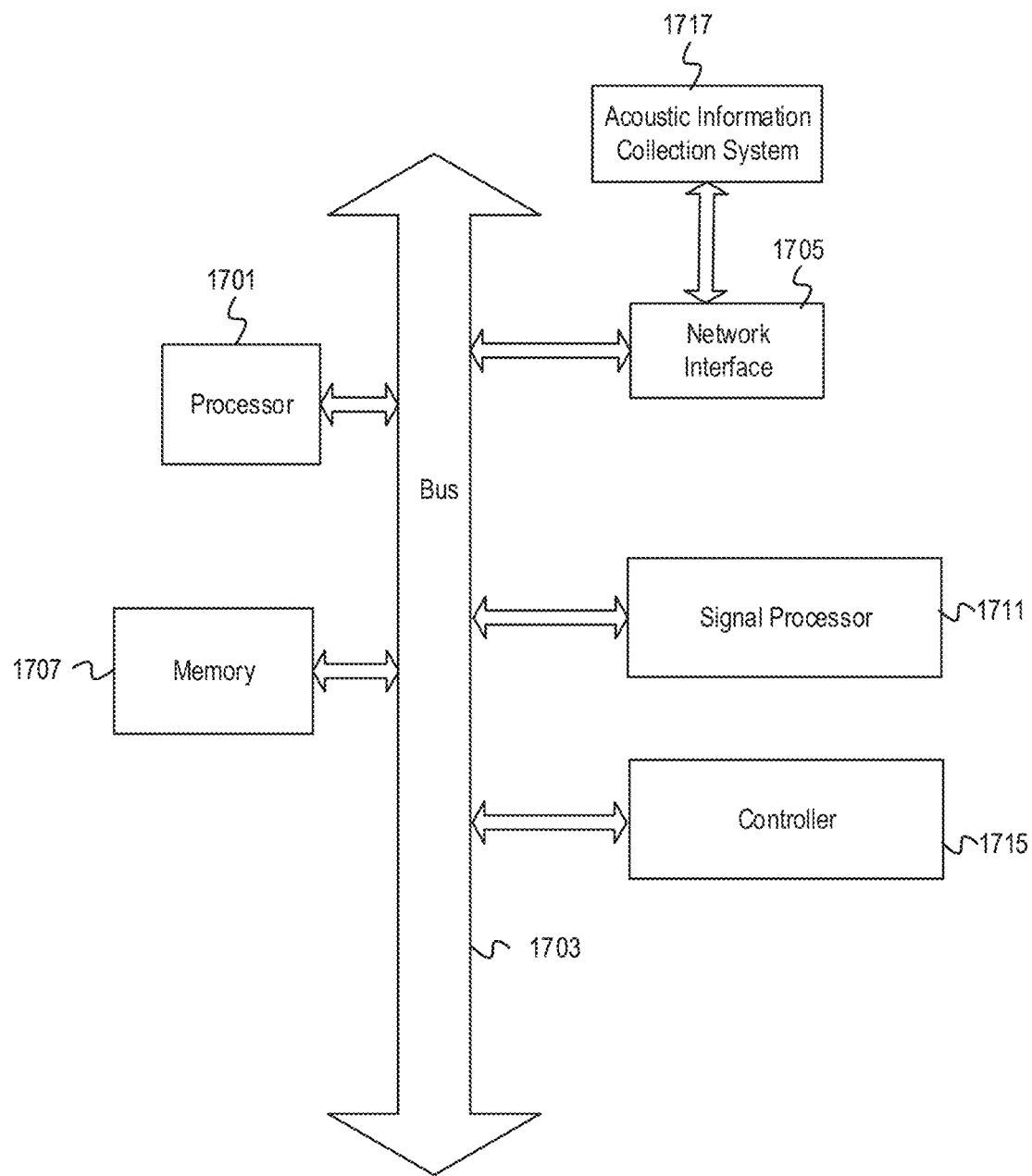
FIG. 17 depicts an example computer configured to implement acoustic measurement testing, according to some embodiments.

FIG. 17 depicts an example computer system, according to some embodiments. The computer includes a processor 1701. The computer includes memory 1707, a bus 1703, and a network interface 1705 (e.g., a wireless interface, interface for a wired connection, etc.). The computer also includes a signal processor 1711 and a controller 1715. The signal processor 1711 can perform the different signal processing as described above. The controller 1715 can perform different borehole operations such as acoustic logging operations based on the processed signals as described above. The computer system further includes an acoustic information collection system 1717 that may be deployed within an acoustic logging tool and/or a surface processing system. Acoustic information collection system 1717 may provide pre-processed and/or processed acoustic signal information to controller 1715 via network interface 1705. Any one of the previously described functionalities may be partially (or entirely) implemented in hardware and/or on the processor 1701. For example, the functionality may be implemented with an application specific integrated circuit, in logic implemented in the processor 1701, in a co-processor on a peripheral device or card, etc. Further, realizations may include fewer or additional components not illustrated in FIG. 17. The processor 1701 and the network interface 1705 are coupled to the bus 1703. Although illustrated as being coupled to the bus 1703, the memory 1707 may be coupled to the processor 1701.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. The memory 1707 may be system memory or any one or more of the above already described possible realizations of machine-readable media.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure. As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Embodiment 1: A method comprising: determining an offset acoustic waveform at a target point within a borehole; generating a reverse time sequence waveform based on the offset acoustic waveform; generating, by an acoustic source, an acoustic pulse based on the reverse time sequence waveform; and detecting, by an acoustic receiver disposed within the borehole, an acoustic response to the acoustic pulse. Said generating a reverse time sequence waveform may include reversing a time sequence of the offset acoustic waveform. Said generating the acoustic pulse may include converting the reverse time sequence waveform into the acoustic pulse including normalizing the amplitude of the reverse time sequence waveform. Said generating the acoustic pulse may include applying, by a waveform function generator, the normalized amplitude reverse time sequence waveform to generate the acoustic pulse. The offset acoustic waveform may be an impulse waveform. For embodiment 1, a metallic casing may be disposed within the borehole and a cement layer may be disposed in an annular space between the metallic casing and an inner wall of the borehole, and the method may further comprise: disposing the acoustic source at a transmit location within the borehole; determining a target point location within the borehole to coincide with the metallic casing or an interface between the metallic casing and the cement layer; and determining the offset acoustic waveform based, at least in part, on an offset between the transmit location and the target point location. The method may further comprise evaluating a condition of cement bonding to the metallic casing based, at least in part, on the acoustic response. The offset acoustic waveform may be determined from pressure waveform data generated by a waveform simulation program based on acoustic source offset. The method may further comprise: disposing the acoustic source at a transmit location within the borehole; determining a target point location within the borehole; and determining, using the pressure waveform data, the offset acoustic waveform based on a distance between the transmit location and the target point location. The method may further comprise: determining a plurality of offset acoustic waveforms at a target point within a borehole, wherein each of the offset acoustic waveforms corresponds to one of a plurality of acoustic source positions; generating a reverse time sequence waveform for each of the acoustic source positions based on the offset acoustic waveforms; for each of a plurality of acoustic transmitters disposed at positions relative to the target point that correspond to the plurality of acoustic source positions, generating an acoustic pulse based on one of the reverse time sequence waveforms; and detecting, by an acoustic receiver disposed within the borehole, an acoustic response from the acoustic pulses.

Embodiment 2: A system comprising: a processor; a machine-readable medium having instructions stored thereon that are executable by the processor to cause the processor to, determine an offset acoustic waveform at a target point within a borehole; and generate a reverse time sequence waveform based on the offset acoustic waveform; an acoustic transmitter configured to generate an acoustic pulse based on the reverse time sequence waveform; and an acoustic receiver disposed within the borehole and configured to detect an acoustic response from the acoustic pulse. The instructions executable by the processor to cause the processor to generate a reverse time sequence waveform may include instructions executable by the processor to cause the processor to reverse a time sequence of the offset acoustic waveform. The instructions may further comprise instructions executable by the processor to cause the processor to convert the reverse time sequence waveform into the acoustic pulse including normalizing the amplitude of the reverse time sequence waveform. The instructions executable by the processor to cause the processor to generate the acoustic pulse may include instructions executable by the processor to cause the processor to apply the normalized amplitude reverse time sequence waveform to generate the acoustic pulse. A metallic casing may be disposed within the borehole and a cement layer may be disposed in an annular space between the metallic casing and an inner wall of the borehole, and the acoustic transmitter may be disposed at a transmit location within the borehole, and wherein said instructions may further include instructions executable by the processor to cause the processor to: determine a target point location within the borehole to coincide with the metallic casing or an interface between the metallic casing and the cement layer; and determine the offset acoustic waveform based, at least in part, on an offset between the transmit location and the target point location. The instructions may further include instructions executable by the processor to cause the processor to evaluate a condition of cement bonding to the metallic casing based, at least in part, on the acoustic response. The offset acoustic waveform may be determined from pressure waveform data generated by a waveform simulation program based on location offset from an acoustic transmitter. The acoustic transmitter may be disposed at a transmit location within the borehole, and the instructions may include instructions executable by the processor to cause the processor to: determine a target point location within the borehole; and determine, using the pressure waveform data, the offset acoustic waveform based on a distance between the transmit location and the target point location.

Embodiment 3: A method for performing downhole acoustics measurements, said method comprising: determining whether to transmit in short pulse mode or spread spectrum mode based, at least in part, on determined source interference; and in response to selecting to transmit in spread spectrum mode, transmitting, from the acoustic source, an acoustic frequency chirp comprising a sequence of harmonic waves; detecting, by the acoustic receiver, an acoustic response to the acoustic frequency chirp; and performing a signal time compression of the detected acoustic response to generate an impulse response. Said determining whether to transmit in short pulse mode or spread spectrum mode may include determining whether to transmit in short pulse mode or spread spectrum mode based, at least in part, on a distance between an acoustic source and an acoustic receiver with reference to a threshold distance. Said performing a signal time compression comprises cross-correlating the detected acoustic response with the acoustic frequency chirp. The acoustic frequency chirp may comprise a sequence of harmonic waves increasing or decreasing in frequency over a chirp interval. The method may further comprise, in response to selecting to transmit in short pulse mode, determining an offset acoustic waveform at a target point within a borehole; generating a reverse time sequence waveform based on the offset acoustic waveform; generating, by the acoustic source, an acoustic pulse based on the reverse time sequence waveform; and detecting, by an acoustic receiver disposed within the borehole, an acoustic response to the acoustic pulse.

The invention claimed is:

1. A method comprising:
   positioning an acoustic receiver in a borehole
   determining an impulse response waveform at a target point within the borehole, wherein determining is one of lab acoustic testing or simulation modeling;
   generating a reverse time sequence waveform based on the impulse response waveform;
   generating, by an acoustic source, an acoustic pulse based on the reverse time sequence waveform; and
   detecting, by the acoustic receiver, an acoustic response to the acoustic pulse.

2. The method of claim 1, further comprising:
   determining a plurality of impulse response waveforms at the target point within a borehole, wherein each of the impulse response waveforms corresponds to one of a plurality of acoustic source positions;
   generating a reverse time sequence waveform for each of the acoustic source positions based on the impulse response waveforms;
   for each of a plurality of acoustic transmitters disposed at positions relative to the target point that correspond to the plurality of acoustic source positions, generating an acoustic pulse based on one of the reverse time sequence waveforms; and
   detecting, by an acoustic receiver disposed within the borehole, an acoustic response from the acoustic pulses.

3. The method of claim 1, wherein the borehole has a casing and cement positioned between a wall of the borehole and the casing.

4. The method of claim 3, further comprising evaluating a condition of the cement based on the acoustic response.

5. The method of claim 1, wherein a metallic casing is disposed within the borehole and a cement layer is disposed in an annular space between the metallic casing and an inner wall of the borehole, said method further comprising:
   disposing the acoustic source at a transmit location within the borehole;
   determining a target point location within the borehole to coincide with the metallic casing or an interface between the metallic casing and the cement layer; and
   determining the impulse response waveform based, at least in part, on an offset between the transmit location and the target point location.

6. The method of claim 5, further comprising evaluating a condition of cement bonding to the metallic casing based, at least in part, on the acoustic response.

7. The method of claim 1, wherein the impulse response waveform is determined from pressure waveform data generated by a waveform simulation program based on acoustic source offset.

8. The method of claim 7, further comprising:
   disposing the acoustic source at a transmit location within the borehole;
   and
   determining, using the pressure waveform data, the impulse response waveform based on a distance between the transmit location and the target point.

9. The method of claim 1, wherein said generating a reverse time sequence waveform includes reversing a time sequence of the impulse response waveform.

10. The method of claim 9, wherein said generating the acoustic pulse includes converting the reverse time sequence waveform into the acoustic pulse including normalizing the amplitude of the reverse time sequence waveform.

11. The method of claim 10, wherein said generating the acoustic pulse includes applying, by a waveform function generator, the normalized amplitude reverse time sequence waveform to generate the acoustic pulse.

12. A system comprising:
   a processor;
   a machine-readable medium having instructions stored thereon that are executable by the processor, the instructions comprising:
      instructions to determine an impulse response waveform at a target point within a borehole, wherein the impulse response waveform is determined by one of lab acoustic testing or simulation modeling; and instructions to generate a reverse time sequence waveform based on the impulse response waveform;

an acoustic transmitter configured to generate an acoustic pulse based on the reverse time sequence waveform; and an acoustic receiver disposed within the borehole and configured to detect an acoustic response from the acoustic pulse.

13. The system of claim 12, wherein a metallic casing is disposed within the borehole and a cement layer is disposed in an annular space between the metallic casing and an inner wall of the borehole, and wherein the acoustic transmitter is disposed at a transmit location within the borehole, said instructions further including instructions executable by the processor to cause the processor to:

determine a target point location within the borehole to coincide with the metallic casing or an interface between the metallic casing and the cement layer; and determine the impulse response waveform based, at least in part, on an offset between the transmit location and the target point location.

14. The system of claim 13, wherein the instructions further include instructions executable by the processor to cause the processor to evaluate a condition of cement bonding to the metallic casing based, at least in part, on the acoustic response.

15. The system of claim 12, wherein the impulse response waveform is determined from pressure waveform data generated by a waveform simulation program based on location offset from an acoustic transmitter.

16. The system of claim 15, wherein the acoustic transmitter is disposed at a transmit location within the borehole, and wherein the instructions comprise:

instructions to determine a target point location within the borehole; and instructions to determine, using the pressure waveform data, the impulse response waveform based on a distance between the transmit location and the target point location.

17. The system of claim 12, wherein the instructions include instructions to generate a reverse time sequence waveform include instructions executable by the processor to cause the processor to reverse a time sequence of the impulse response waveform.

18. The system of claim 17, wherein the instructions further comprise instructions to convert the reverse time sequence waveform into the acoustic pulse including normalizing the amplitude of the reverse time sequence waveform.

19. The system of claim 18, wherein the instructions further comprise instructions to generate the acoustic pulse include instructions executable by the processor to cause the processor to apply the normalized amplitude reverse time sequence waveform to generate the acoustic pulse.

* * * * *